United States Patent
d'Abreu et al.

(10) Patent No.: US 12,189,944 B1
(45) Date of Patent: Jan. 7, 2025

(54) DEVICES AND SYSTEMS HAVING A PROTOCOL-INDEPENDENT INTERFACE SUPPORTING A PLURALITY OF DATA PROTOCOLS, AND METHODS RELATED THERETO

(71) Applicant: SMART IOPS, INC., Milpitas, CA (US)

(72) Inventors: Manuel Antonio d'Abreu, El Dorado Hills, CA (US); Ashutosh Kumar Das, Cupertino, CA (US)

(73) Assignee: SMART IOPS, INC., Milpitas, CA (US)

( * ) Notice: Subject to any disclaimer, the term of this patent is extended or adjusted under 35 U.S.C. 154(b) by 7 days.

(21) Appl. No.: 18/348,297

(22) Filed: Jul. 6, 2023

Related U.S. Application Data

(60) Provisional application No. 63/367,890, filed on Jul. 7, 2022.

(51) Int. Cl.
*G06F 3/00* (2006.01)
*G06F 3/06* (2006.01)

(52) U.S. Cl.
CPC .......... *G06F 3/0607* (2013.01); *G06F 3/0661* (2013.01); *G06F 3/0679* (2013.01)

(58) Field of Classification Search
CPC ..... G06F 3/0607; G06F 3/0661; G06F 3/0679
See application file for complete search history.

(56) References Cited

U.S. PATENT DOCUMENTS

| | | | | |
|---|---|---|---|---|
| 5,371,736 A | * | 12/1994 | Evan ................... | H04L 9/40 370/470 |
| 6,640,278 B1 | * | 10/2003 | Nolan .................. | G06F 3/0617 707/999.102 |
| 7,535,917 B1 | * | 5/2009 | Son ...................... | H04L 69/323 370/469 |
| 2020/0293464 A1 | * | 9/2020 | Mizrahi ............... | G06F 3/0661 |

\* cited by examiner

*Primary Examiner* — Craig S Goldschmidt
(74) *Attorney, Agent, or Firm* — MT HUNT LAW; Marcus T. Hunt

(57) ABSTRACT

A solid-state storage device is provided that includes: a controller; non-volatile memory; a device interface; and a protocol-independent interface configured to couple to any one of a plurality of network adapters and communication ports so as to enable the controller to transmit data from the any one of the plurality of network adapters and communication ports. The controller is configured to receive data formatted according to a first protocol from an accessing device via the device interface. The protocol-independent interface includes a plurality of contacts coupled to the controller by a plurality of signal lines that enable data transmission from the controller to the protocol-independent interface. Each of the signal lines of the plurality of signal lines and each of the contacts of the plurality of contacts are configured to be enabled or disabled to form different channels through the protocol-independent interface to accommodate various target protocols.

20 Claims, 7 Drawing Sheets

800

805
Provide a storage device having a protocol-independent I/F and protocol translation module.

810
Select a type of network adapter and communication port and couple to the storage device.

815
Determine the target protocol required for protocol-independent I/F based on the type of network adapter and communication port selected.

820
Set a switch to select a target protocol and form a corresponding channel through the protocol-independent interface for the selected target protocol.

825
Send an indication of the selected target protocol to the storage device.

830
Receive an indication of a selected target protocol for a protocol-independent I/F.

835
Execute training instructions for the selected target protocol to train the translator module to format data according to the selected target protocol.

840
Receive data from the device I/F of the storage device.

845
Reformat the data according to the selected target protocol.

850
Send the reformatted data through the protocol-independent I/F for transmission from the network adapter and communication port.

FIG. 8

DEVICES AND SYSTEMS HAVING A PROTOCOL-INDEPENDENT INTERFACE SUPPORTING A PLURALITY OF DATA PROTOCOLS, AND METHODS RELATED THERETO

CROSS-REFERENCE TO RELATED APPLICATIONS

This application claims benefit under 35 U.S.C. § 119 (e) of U.S. Provisional Application No. 63/367,890, filed Jul. 7, 2022, the entirety of which is incorporated herein by reference.

FIELD

The present disclosure is related to storage, and more particularly to storage systems and the diverse implementations of storage systems utilizing a variety of protocol schemes.

BACKGROUND

With advances in the number of computing and storage systems, many types of interfaces (or connectors) and protocols exist for implementation within a system. Having various types of interfaces and protocols within a system, however, can present issues and challenges when it comes to interoperability. There is no coherent method that addresses such interoperability issues and challenges for the effective deployment and use of a storage system supporting multiple protocols.

SUMMARY

In one aspect, a solid-state storage device is provided and includes: a controller; non-volatile memory coupled to the controller; a device interface coupled to the controller; and a protocol-independent interface coupled to the controller. The controller is configured to perform read and write commands on the non-volatile memory. The controller is further configured to receive data formatted according to a first protocol from an accessing device via the device interface. The protocol-independent interface is configured to couple to any one of a plurality of network adapters and communication ports so as to enable the controller to transmit data from the any one of the plurality of network adapters and communication ports. Each of the plurality of network adapters and communication ports require a different target protocol for data transmission through the protocol-independent interface. Each of the target protocols is also different from the first protocol. The protocol-independent interface includes a plurality of contacts. The plurality of contacts are coupled to the controller by a plurality of signal lines that enable data transmission from the controller to the protocol-independent interface. Each of the signal lines of the plurality of signal lines and each of the contacts of the plurality of contacts are configured to be enabled or disabled to form different channels through the protocol-independent interface for each of the target protocols.

In an embodiment, the solid-state storage device further includes a switch coupled to the protocol-independent interface and configured to enable selection of any of the target protocols for data transmission through the protocol-independent interface. The switch is further configured to enable or disable each of the signal lines of the plurality of signal lines and each of the contacts of the plurality of contacts to form the different channels through the protocol-independent interface based on the selection of the switch.

In an embodiment, the controller is further configured to receive an indication of a first target protocol selected with the switch for data transmission through the protocol-independent interface. The indication includes training instructions for training the controller to reformat data according to the selected first target protocol. The controller is further configured to execute the training instructions to train the controller to reformat data according to the selected first target protocol.

In an embodiment, the controller is further configured to receive an indication of a first target protocol selected with the switch for data transmission through the protocol-independent interface. The indication includes information identifying the selected first target protocol and is absent the training instructions for training the controller to reformat data according to the selected first target protocol. The controller is further configured to retrieve the training instructions from an on-controller memory or the non-volatile memory; and execute the training instructions to train the controller to reformat data according to the selected first target protocol.

In an embodiment, the switch is further configured for manual selection of any of the target protocols during setup of the solid-state storage device with the any one of the network adapters and communication ports.

In an embodiment, the first target protocol is selected based on a first network adapter and a first communication port coupled to the protocol-independent interface. Each of the signal lines of the plurality of signal lines and each of the contacts of the plurality of contacts are further configured to be enabled or disabled to form a first channel through the protocol-independent interface based on the selected first target protocol. The controller is configured to: receive first data formatted according to the first protocol from the accessing device via the device interface; reformat the first data according to the selected first target protocol; and transmit the reformatted first data through the protocol-independent interface via the enabled signal lines of the plurality of signal lines and the enabled contacts of the plurality of contacts so that the reformatted data can be transmitted from the first network adapter and the first communication port.

In an embodiment, the controller is further configured to receive an indication of a first target protocol selected for data transmission through the protocol-independent interface. The first target protocol is selected based on a first network adapter and a first communication port coupled to the protocol-independent interface. Each of the signal lines of the plurality of signal lines and each of the contacts of the plurality of contacts are further configured to be enabled or disabled to form a first channel through the protocol-independent interface based on the selected first target protocol. The controller is further configured to receive first data formatted according to the first protocol from the accessing device via the device interface; reformat the first data according to the selected first target protocol; and transmit the reformatted first data through the protocol-independent interface via the enabled signal lines of the plurality of signal lines and the enabled contacts of the plurality of contacts so that the reformatted data can be transmitted from the first network adapter and the first communication port.

In an embodiment, the indication of the first target protocol includes training instructions for training the controller to reformat data according to the selected first target protocol. The controller is further configured to execute the training instructions to train the controller to reformat data according to the selected first target protocol.

In an embodiment, the indication of the first target protocol includes information identifying the selected first target protocol and is absent training instructions for training the controller to reformat data according to the selected first target protocol. The controller is further configured to: retrieve the training instructions from an on-controller memory or the non-volatile memory; and execute the training instructions to train the controller to reformat data according to the selected first target protocol.

In an embodiment, solid-state storage device further includes a switch coupled to the protocol-independent interface and configured to enable selection of any of the target protocols for data transmission through the protocol-independent interface. The switch is further configured to enable or disable each of the signal lines of the plurality of signal lines and each of the contacts of the plurality of contacts to form the different channels through the protocol-independent interface based on the selection of the switch.

In an embodiment, the first protocol includes PCIe and the first communication port includes any generation of Ethernet, Fibre Channel, or SATA.

In an embodiment, the training instructions include instructions for training the controller to format data according to specific formatting parameters of a selected target protocol. The specific formatting parameters include at least one of: control information, the size of data, timing parameters, data rates, error correction codes, and signals to be transmitted on the enabled signal lines from the controller to the protocol independent interface.

In one aspect, a method is provided and includes receiving, by a controller of a solid-state storage device, an indication of a first target protocol selected for data transmission through a protocol-independent interface. The solid-state storage device includes the controller; non-volatile memory coupled to the controller; a device interface coupled to the controller; and the protocol-independent interface coupled to the controller. The controller is configured to perform read and write commands on the non-volatile memory. The controller is further configured to receive data formatted according to a first protocol from an accessing device via the device interface. The protocol-independent interface is configured to couple to any one of a plurality of network adapters and communication ports so as to enable the controller to transmit data from the any one of the plurality of network adapters and communication ports. Each of the plurality of network adapters and communication ports require a different target protocol for data transmission through the protocol-independent interface. Each of the target protocols is also different from the first protocol. The protocol-independent interface includes a plurality of contacts. The plurality of contacts are coupled to the controller by a plurality of signal lines that enable data transmission from the controller to the protocol-independent interface. Each of the signal lines of the plurality of signal lines and each of the contacts of the plurality of contacts are configured to be enabled or disabled to form different channels through the protocol-independent interface for each of the target protocols. The method further includes executing, by the controller, training instructions to train the controller to reformat data according to the selected first target protocol.

In an embodiment, the solid-state storage device further includes a switch coupled to the protocol-independent interface and configured to enable selection of any of the target protocols for data transmission through the protocol-independent interface. The switch is further configured to enable or disable each of the signal lines of the plurality of signal lines and each of the contacts of the plurality of contacts to form the different channels through the protocol-independent interface based on the selection of the switch.

In an embodiment, the first target protocol is selected with the switch for data transmission through the protocol-independent interface. The indication includes the training instructions for training the controller to reformat data according to the selected first target protocol.

In an embodiment, the first target protocol is selected with the switch for data transmission through the protocol-independent interface. The indication includes information identifying the selected first target protocol and is absent the training instructions for training the controller to reformat data according to the selected first target protocol. The method further includes retrieving, by the controller, the training instructions from an on-controller memory or the non-volatile memory.

In an embodiment, the switch is further configured for manual selection of any of the target protocols during setup of the solid-state storage device with the any one of the network adapters and communication ports.

In an embodiment, the first target protocol is selected based on a first network adapter and a first communication port coupled to the protocol-independent interface. Each of the signal lines of the plurality of signal lines and each of the contacts of the plurality of contacts are further configured to be enabled or disabled to form a first channel through the protocol-independent interface based on the selected first target protocol. The method further includes: receiving, by the controller, first data formatted according to the first protocol from the accessing device via the device interface; reformatting, by the controller, the first data according to the selected first target protocol; and transmitting, by the controller, the reformatted first data through the protocol-independent interface via the enabled signal lines of the plurality of signal lines and the enabled contacts of the plurality of contacts so that the reformatted data can be transmitted from the first network adapter and the first communication port.

In an embodiment, the first target protocol is selected based on a first network adapter and a first communication port coupled to the protocol-independent interface. Each of the signal lines of the plurality of signal lines and each of the contacts of the plurality of contacts are further configured to be enabled or disabled to form a first channel through the protocol-independent interface based on the selected first target protocol. The method further includes: receiving, by the controller, first data formatted according to the first protocol from the accessing device via the device interface; reformatting, by the controller, the first data according to the selected first target protocol; and transmitting, by the controller, the reformatted first data through the protocol-independent interface via the enabled signal lines of the plurality of signal lines and the enabled contacts of the plurality of contacts so that the reformatted data can be transmitted from the first network adapter and the first communication port.

In an embodiment, the indication of the first target protocol includes training instructions for training the controller to reformat data according to the selected first target protocol.

In an embodiment, the indication of the first target protocol includes information identifying the selected first target protocol and is absent the training instructions for training the controller to reformat data according to the selected first target protocol. The method further includes retrieving, by the controller, the training instructions from an on-controller memory or the non-volatile memory.

In an embodiment, the solid-state storage device further includes a switch coupled to the protocol-independent interface and configured to enable selection of any of the target protocols for data transmission through the protocol-independent interface. The switch is further configured to enable or disable each of the signal lines of the plurality of signal lines and each of the contacts of the plurality of contacts to form the different channels through the protocol-independent interface based on the selection of the switch.

In an embodiment, the first protocol includes PCIe and the first communication port includes any generation of Ethernet, Fibre Channel, or SATA.

In an embodiment, the training instructions include instructions for training the controller to format data according to specific formatting parameters of a selected target protocol. The specific formatting parameters include at least one of: control information, the size of data, timing parameters, data rates, error correction codes, and signals to be transmitted on the enabled signal lines from the controller to the protocol independent interface.

In one aspect, a non-transitory machine-readable storage medium storing machine-executable instructions that, when executed, cause a controller to perform a method for enabling a protocol-independent interface to support one of a plurality of target protocols is provided and includes receiving, by a controller of a solid-state storage device, an indication of a first target protocol selected for data transmission through a protocol-independent interface. The solid-state storage device includes the controller; non-volatile memory coupled to the controller; a device interface coupled to the controller; and the protocol-independent interface coupled to the controller. The controller is configured to perform read and write commands on the non-volatile memory. The controller is further configured to receive data formatted according to a first protocol from an accessing device via the device interface. The protocol-independent interface is configured to couple to any one of a plurality of network adapters and communication ports so as to enable the controller to transmit data from the any one of the plurality of network adapters and communication ports. Each of the plurality of network adapters and communication ports require a different target protocol for data transmission through the protocol-independent interface. Each of the target protocols is also different from the first protocol. The protocol-independent interface includes a plurality of contacts. The plurality of contacts are coupled to the controller by a plurality of signal lines that enable data transmission from the controller to the protocol-independent interface. Each of the signal lines of the plurality of signal lines and each of the contacts of the plurality of contacts are configured to be enabled or disabled to form different channels through the protocol-independent interface for each of the target protocols. The method further includes executing, by the controller, training instructions to train the controller to reformat data according to the selected first target protocol.

In an embodiment, the solid-state storage device further includes a switch coupled to the protocol-independent interface and configured to enable selection of any of the target protocols for data transmission through the protocol-independent interface. The switch is further configured to enable or disable each of the signal lines of the plurality of signal lines and each of the contacts of the plurality of contacts to form the different channels through the protocol-independent interface based on the selection of the switch.

In an embodiment, the first target protocol is selected with the switch for data transmission through the protocol-independent interface. The indication includes the training instructions for training the controller to reformat data according to the selected first target protocol.

In an embodiment, the first target protocol is selected with the switch for data transmission through the protocol-independent interface. The indication includes information identifying the selected first target protocol and is absent the training instructions for training the controller to reformat data according to the selected first target protocol. The method further includes retrieving, by the controller, the training instructions from an on-controller memory or the non-volatile memory.

In an embodiment, the switch is further configured for manual selection of any of the target protocols during setup of the solid-state storage device with the any one of the network adapters and communication ports.

In an embodiment, the first target protocol is selected based on a first network adapter and a first communication port coupled to the protocol-independent interface. Each of the signal lines of the plurality of signal lines and each of the contacts of the plurality of contacts are further configured to be enabled or disabled to form a first channel through the protocol-independent interface based on the selected first target protocol. The method further includes: receiving, by the controller, first data formatted according to the first protocol from the accessing device via the device interface; reformatting, by the controller, the first data according to the selected first target protocol; and transmitting, by the controller, the reformatted first data through the protocol-independent interface via the enabled signal lines of the plurality of signal lines and the enabled contacts of the plurality of contacts so that the reformatted data can be transmitted from the first network adapter and the first communication port.

In an embodiment, the first target protocol is selected based on a first network adapter and a first communication port coupled to the protocol-independent interface. Each of the signal lines of the plurality of signal lines and each of the contacts of the plurality of contacts are further configured to be enabled or disabled to form a first channel through the protocol-independent interface based on the selected first target protocol. The method further includes: receiving, by the controller, first data formatted according to the first protocol from the accessing device via the device interface; reformatting, by the controller, the first data according to the selected first target protocol; and transmitting, by the controller, the reformatted first data through the protocol-independent interface via the enabled signal lines of the plurality of signal lines and the enabled contacts of the plurality of contacts so that the reformatted data can be transmitted from the first network adapter and the first communication port.

In an embodiment, the indication of the first target protocol includes training instructions for training the controller to reformat data according to the selected first target protocol.

In an embodiment, the indication of the first target protocol includes information identifying the selected first target protocol and is absent the training instructions for training the controller to reformat data according to the selected first target protocol. The method further includes retrieving, by the controller, the training instructions from an on-controller memory or the non-volatile memory.

In an embodiment, the solid-state storage device further includes a switch coupled to the protocol-independent interface and configured to enable selection of any of the target protocols for data transmission through the protocol-independent interface. The switch is further configured to enable or disable each of the signal lines of the plurality of signal lines and each of the contacts of the plurality of contacts to form the different channels through the protocol-independent interface based on the selection of the switch.

In an embodiment, the first protocol includes PCIe and the first communication port includes any generation of Ethernet, Fibre Channel, or SATA.

In an embodiment, the training instructions include instructions for training the controller to format data according to specific formatting parameters of a selected target protocol. The specific formatting parameters include at least one of: control information, the size of data, timing parameters, data rates, error correction codes, and signals to be transmitted on the enabled signal lines from the controller to the protocol independent interface.

In one aspect, a method of installing and setting up a solid-state device having a protocol-independent interface supporting a plurality of protocols is provided. The method includes providing a solid-state storage device. The solid-state storage device includes: a controller; non-volatile memory coupled to the controller; a device interface coupled to the controller; and a protocol-independent interface coupled to the controller. The controller is configured to perform read and write commands on the non-volatile memory. The controller is further configured to receive data formatted according to a first protocol from an accessing device via the device interface. The protocol-independent interface is configured to couple to any one of a plurality of network adapters and communication ports so as to enable the controller to transmit data from the any one of the plurality of network adapters and communication ports. Each of the plurality of network adapters and communication ports require a different target protocol for data transmission through the protocol-independent interface. Each of the target protocols is also different from the first protocol. The protocol-independent interface includes a plurality of contacts. The plurality of contacts are coupled to the controller by a plurality of signal lines that enable data transmission from the controller to the protocol-independent interface. Each of the signal lines of the plurality of signal lines and each of the contacts of the plurality of contacts are configured to be enabled or disabled to form different channels through the protocol-independent interface for each of the target protocols.

In an embodiment, the solid-state storage device further includes a switch coupled to the protocol-independent interface and configured to enable selection of any of the target protocols for data transmission through the protocol-independent interface. The switch is further configured to enable or disable each of the signal lines of the plurality of signal lines and each of the contacts of the plurality of contacts to form the different channels through the protocol-independent interface based on the selection of the switch. The method further includes setting the switch to the selection of the first target protocol.

In an embodiment, the indication includes the training instructions for training the controller to reformat data according to the selected first target protocol.

In an embodiment, the indication includes information identifying the selected first target protocol and is absent the training instructions for training the controller to reformat data according to the selected first target protocol.

In an embodiment, the switch is set manually during setup of the solid-state storage device with the any one of the network adapters and communication ports.

In an embodiment, the method further includes coupling the protocol-independent interface to a first network adapter and a first communication port. The first target protocol is selected based on the first network adapter and the first communication port coupled to the protocol-independent interface. Each of the signal lines of the plurality of signal lines and each of the contacts of the plurality of contacts are further configured to be enabled or disabled to form a first channel through the protocol-independent interface based on the selected first target protocol.

In an embodiment, the method further includes coupling the protocol-independent interface to a first network adapter and a first communication port. The first target protocol is selected based on the first network adapter and the first communication port coupled to the protocol-independent interface. Each of the signal lines of the plurality of signal lines and each of the contacts of the plurality of contacts are further configured to be enabled or disabled to form a first channel through the protocol-independent interface based on the selected first target protocol.

In an embodiment, the indication of the first target protocol includes training instructions for training the controller to reformat data according to the selected first target protocol.

In an embodiment, the indication of the first target protocol includes information identifying the selected first target protocol and is absent the training instructions for training the controller to reformat data according to the selected first target protocol.

In an embodiment, the solid-state storage device further includes a switch coupled to the protocol-independent interface and configured to enable selection of any of the target protocols for data transmission through the protocol-independent interface. The switch is configured to enable or disable each of the signal lines of the plurality of signal lines and each of the contacts of the plurality of contacts to form the different channels through the protocol-independent interface based on the selection of the switch. The method further includes setting the switch to the selection of the first target protocol.

In an embodiment, the first protocol includes PCIe and the first communication port includes any generation of Ethernet, Fibre Channel, or SATA.

In an embodiment, the training instructions include instructions for training the controller to format data according to specific formatting parameters of a selected target protocol. The specific formatting parameters include at least one of: control information, the size of data, timing parameters, data rates, error correction codes, and signals to be transmitted on the enabled signal lines from the controller to the protocol independent interface.

In an embodiment, the method further includes coupling an interface adapter to the protocol-independent interface. The interface adapter is configured to couple to the protocol-independent interface on a first end and to provide a predetermined form factor and pin configuration for the selected target protocol on a second end.

In an embodiment, the first indication is sent to the controller via the accessing device.

BRIEF DESCRIPTION OF THE DRAWINGS

For a better understanding of at least an embodiment, reference will be made to the following Detailed Description, which is to be read in conjunction with the accompanying drawings, wherein:

FIG. 8 illustrates a flowchart for an example method of setting up a protocol-independent I/F for a selected target protocol and reformatting data based upon the selected target protocol for transmission through the protocol-independent I/F, according to an embodiment.

DETAILED DESCRIPTION

Figure 1A:
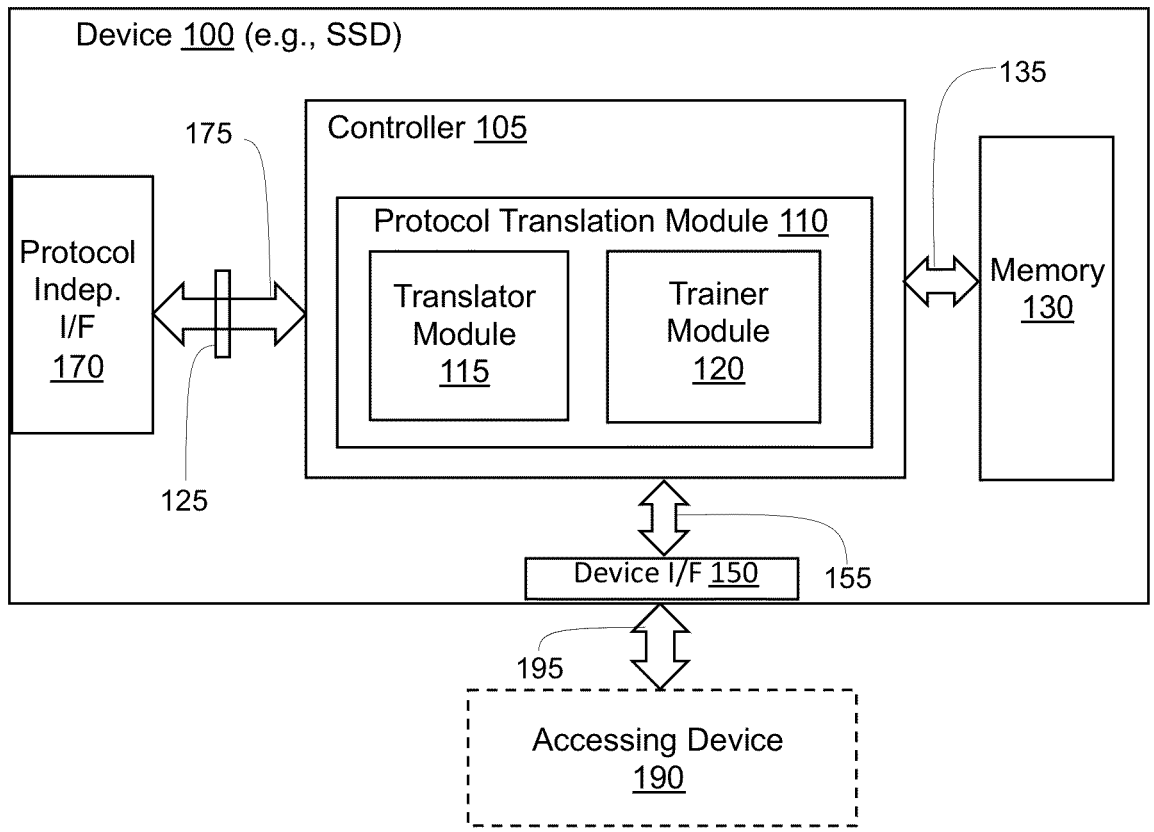
FIG. 1A illustrates a block diagram of an example device including a protocol translation module and protocol-independent I/F, according to an embodiment.

Before aspects of the present disclosure are described below with reference to the drawings in the description, common features may be designated by common reference numbers. Although certain examples are described herein with reference to a storage system, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more conditions, or events not explicitly recited. As used herein, "exemplary" may indicate an example, an implementation, and/or an aspect, and should not be construed as limiting or as indicating a preference or a preferred example, implementation, and/or aspect.

With advances in the number of computing and storage systems, a coherent method to support interoperability of multiple protocols is needed and critical for the effective deployment and use of storage systems. As an illustrative example, a storage system that uses a PCIe connector may have to support multiple independent interfaces (I/Fs). For example, a storage system may include multiple solid-state drives (SSDs) having different independent interfaces. For instance, the SSDs in the system may utilize PCIe interfaces to communicate with the system's processor (or computer processor) but also utilize different technologies or generations of technologies on other interfaces, such as a Fibre Channel interface on one SSD, Ethernet on another SSD, a specific generation (e.g., third, fourth, or fifth) of PCIe on yet other SSDs, a dual in-line memory module (DIMM) on yet another SSD, etc. The present disclosure can be applicable to a wide range of applications, such as the following illustrative and non-limiting applications: storage, storage systems, computing systems, communication and networking systems, appliances on the internet, remotely controlled appliances, design of reliable systems, etc.

In certain aspects, the present disclosure provides systems and methods that enable a protocol-independent I/F on a storage system to support various interface technologies, such as Fibre Channel, Ethernet, PCIe, DIMM, or other standard technology or generation of technology. It should be appreciated that a system can refer to the system within a single device or collectively to a system of multiple devices. In one embodiment, an SSD can include a protocol-independent I/F that can support multiple interface protocols depending on the desired application. For instance, a single SSD having a protocol-independent I/F can be configured for any one of the multiple interface protocol technologies as needed for a desired application. The techniques described herein enables systems using different interface technologies (e.g., protocols and connectors) to operate seamlessly without loss of performance due to encapsulation.

In certain aspects, the present disclosure provides storage systems and related methods that enable seamless operation between different communication and networking protocols, in an integrated manner, such that the system can support receiving and transmitting data efficiently using standard interfaces. Storage system interfaces and form factors may include, for example, any PCIe based solid-state drives (SSDs), M.2 form factor, U.2 form factor, SATA or SAS, DIMM, USB drives, SD cards, MicroSD cards, or packaged die products. This list of storage systems is not an exhaustive list but an illustrative example.

FIG. 1A illustrates a block diagram of an example device including a protocol translation module and protocol-independent I/F, according to an embodiment. In FIG. 1A, a device 100 is shown including a controller (or control unit) 105, a protocol translation module 110, a memory 130, a device interface I/F 150, and a protocol-independent I/F 170. The controller 105 is coupled to the memory 130 via a communication path 135, which can be an electrical bus for instance. The controller 105 sends memory commands to the memory 130 via the communication interface 135. The memory commands enable the performance of read and write operations for the memory 130. In an embodiment, the device 100 is a solid-state drive (SSD) and includes non-volatile memory, such as flash memory. It should also be appreciated that the configuration shown for device 100 in FIG. 1A is illustrative and that other configurations may be implemented without compromising the underlying principles of the disclosure. For example, the device 100 may include a memory connection module (not shown) that enables the memory 130 to be removably coupled to the device 100 via the memory connection module.

The type of memory 130 may vary in different embodiments. In an embodiment, the memory 130 may include a memory array that consists of a cluster of memory devices. The memory 130 may include a flash memory, such as a NAND flash memory, or a resistive memory, such as a resistive random access memory (ReRAM), 3D-Xpoint, as illustrative, non-limiting examples. In an embodiment, the memory 130 may include a three-dimensional (3D) memory configuration. As an example, the memory 130 may have a 3D vertical bit line (VBL) configuration. In an embodiment, the memory 130 may include non-volatile memory having a 3D memory configuration that is monolithically formed in one or more physical levels of arrays of memory cells having an active area disposed above a silicon substrate. In another embodiment, the memory 130 may include another configuration, such as a two-dimensional (2D) memory configuration, a monolithic 3-D memory, or a non-monolithic 3D memory configuration (e.g., a stacked die 3D memory configuration). The memory 130 may include one or more memory dies, memory cards, or other storage devices.

The controller 105 is also shown coupled to the protocol-independent I/F 170 via a communication path 175, which can be an electrical bus having multiple signal lines for example. The protocol-independent I/F 170 can include a connector to couple to various types of network adapters (e.g., network interface cards (NICs), host bus adapters (HBAs), etc.) and communication ports (e.g., transceivers) of various protocols, such as Ethernet, Fiber Channel, Serial AT Attachment (SATA), Bluetooth, Small Computer System Interface (SCSI), or any other wired or wireless protocols. The protocol-independent I/F 170 enables the controller 105 to transmit data to the coupled network adapter according to the required protocol so that the data can be transmitted from the coupled communication port. For example, the protocol-independent I/F 170 can be coupled to an Ethernet NIC and transceiver to enable the controller 105 to transmit data from the Ethernet NIC and transceiver. In this way, data (e.g., data received from the accessing device 190) can be reformatted and subsequently transmitted from the Ethernet NIC and transceiver. In some implementations, the network adapter and communication port can be combined into one component or device.

In an embodiment, the protocol-independent I/F 170 can be configured to provide multiple channels to accommodate different protocols used on the protocol-independent I/F 170, such as Ethernet, Fibre Channel, SATA, Bluetooth, or another wired or wireless communication protocol. The term "target protocol" is also used herein to refer to a protocol specifically intended for use on the protocol-independent I/F 170. The target protocol can include any variety of protocols, such as protocols in the OSI layers 1-4 (e.g., physical, data link, network, and transport) or similarly functioning protocols to OSI layers 1-4. The channels can be enabled in hardware, software, or combination thereof. For example, the protocol-independent I/F 170 can include a connector having a set of contacts (e.g., pins, pads, etc.) that can be enabled or disabled to form the channels that accommodate the different target protocols that can be implemented with the protocol-independent I/F 170. Signal lines of the communication path 175 can also be enable or disabled (e.g., activated or deactivated) to form the channels.

In the embodiment shown in FIG. 1A, the controller 105 can be configured to contributed the formation of the channels by enabling and disabling the signal lines of the communication path 175, which in turn can enable and disable corresponding contacts on the protocol-independent I/F 170. The enabling and disabling of the signal lines by the controller 105 can be executed in hardware, software, or a combination of both in different embodiments. The protocol-independent I/F 170 can include a generic connector with a number of contacts (e.g., pins) that is equal to or greater than the number of signal lines needed for the various target protocols that can be supported.

When a target protocol is selected for use with the protocol-independent I/F 170, specific contacts on the connector can be enabled and disabled to accommodate the signals needed for the selected target protocol. For instance, some target protocols may require a single ended connector that sends a nondifferential signal across a single line point to point, for instance, while other target protocols may require a dual-ended connector that sends a differential signal across two lines. As an example, if the protocol-independent interface includes a 16-bit connector, one target protocol may require a single-ended 8-bit connector, so the protocol-independent interface can be configured so that half of the contacts (or pins) on the connector are enabled for use. Alternatively, another target protocol may require a dual-ended 16-bit connector for differential signals, so the protocol-independent interface can be configured so that all of contacts are enabled for use. In this way, for instance, one group of contacts can be enabled to accommodate Fibre Channel through the protocol-independent I/F, another group of contacts can be enabled for Ethernet, and so on for other target protocols. One or more contacts can be common (or shared) for different target protocols, and the corresponding signals to the common contacts can be programmed as necessary to implement the different target protocol.

In the embodiment shown, the device 100 includes a switch 125 that is positioned along the communication path 175 from the protocol-independent I/F 170 to the controller 105. In this way, the switch 125 can be configured to enable and disable the signal lines between the controller 105 and the protocol-independent I/F 170 as needed to accommodate the various target protocols, and in turn enable and disable the corresponding contacts on the protocol-independent I/F 170. The switch 125 can be implemented in hardware, software, or a combination of both in different embodiments. For example, the switch 125 can be an electronic switch coupled along the communication path 175 that can be manually set for various target protocols. Alternatively, the switch 125 can be at least partially implemented in software in the controller to enable and disable (e.g., activate or deactivate) the signal lines from the controller along the communication path 175. In an embodiment, the switch 125 can be manually set by a system administrator, for instance, during the setup of the protocol-independent I/F 170 (or setup of the SSD including a protocol-independent I/F within a storage system) to select a target protocol for the protocol-independent I/F 170. When the switch 125 has selected a target protocol, the controller 105 can be programmed (e.g., with training instructions) to assign the specific signals to be sent along the enabled signal lines for the selected target protocol.

The controller 105 is also shown coupled to the device I/F 150 via a communication path 155, such as an electrical bus for example. The device 100 may communicate with an accessing device (e.g., host device) 190 via the device I/F 150 and a communication path 195, which may include one or more wired or wireless connections. The device I/F 150 can vary in different embodiments to include a variety of connectors, form factors, protocols, etc. For example, the device I/F 150 may include PCIe based SSDs, M.2 form factor, U.2 form factor, SATA or SAS, DIMM, USB drives, SD cards, MicroSD cards, packaged die products, etc. The accessing device 190 can send data to the device 100 via the device I/F 150 and the communication path 195.

The accessing device 190 may include one or more processors (e.g., CPU) that communicates with the controller 105 of the device 100. In an embodiment, the accessing device can include a system board (e.g., on a server) having one or more processors, which can be coupled to more than one device 100, each of which can be configured to accommodate any one of multiple possible target protocols for the protocol-independent I/F 170 as desired for a given application. For instance, a first device 100 can be configured with the protocol-independent I/F 170 for data transmission via Ethernet, a second device 100 can be configured with the protocol-independent I/F 170 for data transmission via Fiber Channel, a third device 100 can be configured with the protocol-independent I/F 170 for data transmission via SATA, etc.

The controller 105 is shown including the protocol translation module 110, which enables the controller 105 to reformat (or translate) and send data received from device I/F 150 to a communication port coupled to the protocol-independent I/F 170 even when the interfaces 150 and 170 utilize different protocols. The protocol translation module 110 is shown including a translator module 115 and a trainer module 120. The trainer module 120 is configured to receive an indication of the target protocol selected (e.g., with the switch 125) for implementation on the protocol-independent I/F 170. The indication can include training instructions for the selected target protocol so that the trainer 120 can train the translator module 115 to format (e.g., format or reformat) data according to the target protocol selected for the protocol-independent I/F 170. Once trained, the translator module 115 can take data received from the device I/F 150 and reformat the data according to the selected target protocol for transmission via the protocol-independent I/F 170. In an embodiment, the training instructions can include instructions for training the controller 105 to format data according to specific formatting parameters for the selected target protocol, such as control information, the size of data (e.g., 4-bit, 8-bit, or 16-bit data frames or packets, etc.), timing parameters, data rates, error correction codes, which signal lines from the controller 105 to the protocol-independent I/F 170 are to be enabled, and which signals are to be transmitted on which enabled signal lines from the controller 105 to the protocol-independent interface 170, etc.

In an embodiment, the indication of the selected target protocol can be sent by the system administrator to the controller 105, such as from the accessing device 190. In an embodiment, the indication of the selected target protocol includes training instructions for the selected target protocol. For example, the training instructions can be sent to the device 100 via the device I/F 150 and the communication path 195. The trainer module 120 receives the training instructions for the selected target protocol and executes the training instructions (e.g., performs training sequences based on the training instructions) in order to train the translator module 115. The translator module 115 is trained to format data according to the parameters for the selected target protocol. The controller 105 can then transmit the reformatted data through the protocol-independent I/F 170 for transmission by the network adapter and communication port coupled to the protocol-independent I/F 170. In another embodiment, the indication of the selected target protocol includes information identifying the selected target protocol and is absent the training instructions. The trainer module 120 can, for example, be preprogrammed with instructions on retrieving the training instructions for various target protocols; or alternatively, instructions for retrieving the training instructions can be included with the information identifying the selected target protocol. The trainer module 120 can retrieve the training instructions from memory on, or coupled to, the device 100 for instance. The training instructions for various selectable target protocols can be stored in tables in the internal memory of the controller (e.g., on-controller memory) or in the memory 130 for instance. For example, once a target protocol is selected by the system administrator with the switch 125 and the indication of the selected target protocol sent to the trainer module 120; the trainer module 120 can then retrieve the training instructions for the selected target protocol from the memory 130 and then execute the training instructions to train the translator module 115. Once trained, the translator module 115 can format data according to the target protocol selected for communication via the protocol-independent I/F 170.

In another embodiment, the trainer module 120 can be configured to detect when the switch 125 is set to one of the target protocols and which target protocol is selected. When the system administrator selects a target protocol with the switch 125, for example, the detection by the trainer module 120 provides the information identifying the selected target protocol absent the training instructions. The trainer module 120 can then retrieve the corresponding training instruction from the memory as similarly described above.

In some implementations, the device 100 may be embedded, such as in accordance with a Joint Electron Devices Engineering Council (JEDEC) Solid State Technology Association Universal Flash Storage (UFS) configuration. For example, the device 100 may be configured to be coupled to embedded memory, such as eMMC® (trademark of JEDEC Solid State Technology Association, Arlington, Virginia) and eSD, as illustrative examples. To illustrate, the device 100 may correspond to an eMMC (embedded MultiMedia Card) device or as SSD. As another example, the device 100 may correspond to a memory card, such as a Secure Digital (SD®) card, a microSD® card, a miniSD™ card (trademarks of SD-3C LLC, Wilmington, Delaware), a MultiMediaCard™ (MMC™) card (trademark of JEDEC Solid State Technology Association, Arlington, Virginia), or a CompactFlash® (CF) card (trademark of SanDisk Corporation, Milpitas, California). Alternatively, the device 100 may be removable device. As an example, the device 100 may be coupled to other cards or devices using universal serial bus (USB) configuration or any other protocol, such as PCIe, SATA, or SAS.

In some implementations, the device 100 may include (or correspond to) an SSD. For example, the device 100 may include an SSD, which may be used as an embedded storage drive (e.g., a mobile embedded storage drive), an enterprise storage drive (ESD), a client storage device, or a cloud storage drive, as illustrative, non-limiting examples. In some implementations, the device 100 is coupled to the other cards or systems indirectly, e.g., via a network. For example, the network may include a data center storage system network, an enterprise storage system network, a storage area network, a cloud storage network, a local area network (LAN), a wide area network (WAN), the Internet, and/or another network. In some implementations, the device 100 may be a network-attached storage (NAS) device or a component (e.g., an SSD) of a data center storage system, an enterprise storage system, or a storage area network. Storage systems include any PCIe based SSDs, M.2 form factor, U.2 form factor, SATA or SAS, or packaged die products.

The trainer module 120 and the translator module 115 include logic to perform the respective training and translating functions, which can be implemented in hardware, software, or combination thereof, in various embodiments. It should be appreciated that the controller 105 may include one or more processing components (e.g., processors, microprocessors, processor cores, etc.) for performing various operations or functions of the controller 105, such as those described for the trainer module 120 and the translator module 115. It should also be appreciated that in other embodiments the functionality of the translator module 115, the trainer module 120, or both, can be implemented as components that are coupled to the controller 105 and configured to work in conjunction with the controller 105. It should also be appreciated that the term controller is used herein broadly and can refer to more than one controller operating in conjunction to perform its functions, such as with a distributive architecture including a main controller coupled to one or more distributed controllers.

Figure 1B:
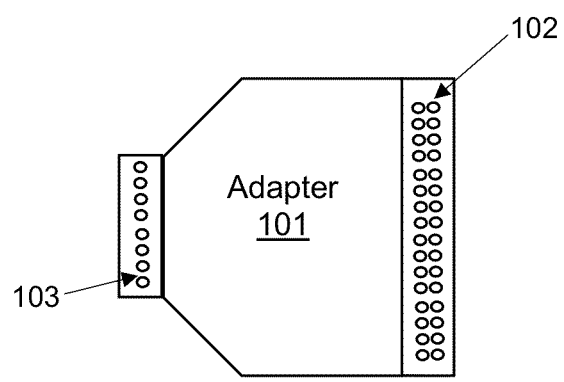
FIG. 1B illustrates an example adaptor that can couple to the protocol-independent I/F to provide a specific form factor, according to an embodiment

In an embodiment, an adaptor can couple to the protocol-independent I/F to provide the specific form factor (e.g., the physical size and shape, the number of pins, the pin layout, etc.) of a connection standard for the selected target protocol. For example, FIG. 1B illustrates an example adaptor that can couple to the protocol-independent I/F to provide a specific form factor, according to an embodiment. The adaptor 101 is shown including two connectors (or connection ends) 102 and 103. The connector 102 has the form factor (e.g., the physical size and shape, the number of pins, the pin layout, etc.) to connect to the protocol-independent I/F 170. The connector 103 has the form factor (e.g., the physical size and shape, the number of pins, the pin layout, etc.) for any standard connection of the selected target protocol—e.g., the form factor of the standard connection to the electrical bus coupled to the applicable network adapter (e.g., NIC) of the selected target protocol. Different target protocols, including generations of target protocols, can require different form factors for the connector 103, in which case the appropriate adaptor 101 having the required form factor can be used to couple to the protocol-independent interface for any given target protocol that is selected. The exemplary connector 102 shown in FIG. 1B is a generic 32 pin connector having 2 parallel rows of 16 pins. The exemplary connector 103 is shown as an 8 pin connector having a single row of 8 pins. Other than the number of pins and the pin layout, the connectors 102 and 103 can also differ in other parameters of the form factor, such as the physical size and shape of the connector. It should be appreciated that the form factors shown for connectors 102 and 103 are exemplary and that other parameters of form factors (e.g., number of pins, pin layout, physical size and shape, etc.) can be used in other embodiments.

As an illustrative example, a network adapter and transceiver that is intended to couple to the protocol-independent I/F 170 may require a specific target protocol for data transmission between the protocol-independent I/F 170 and the network adapter. For instance, the communication path (e.g., electrical bus, ribbon connection, etc.) from the protocol-independent I/F 170 to the intended network adapter may require the 8 pin connector of the connector 103 of the adaptor 101. In such case, the specific target protocol can be selected using the switch 125 to enable a corresponding channel of 8 pins of the 32 pins available on the protocol-independent I/F 170, which can connect to the connector 102 of the adapter 101. The adapter 101 reconfigures the 8 enabled pins from the connector 102 to the form factor of the connector 103, which is the required form factor to accommodate the selected target protocol along the communication path to the intended network adapter.

Figure 2:
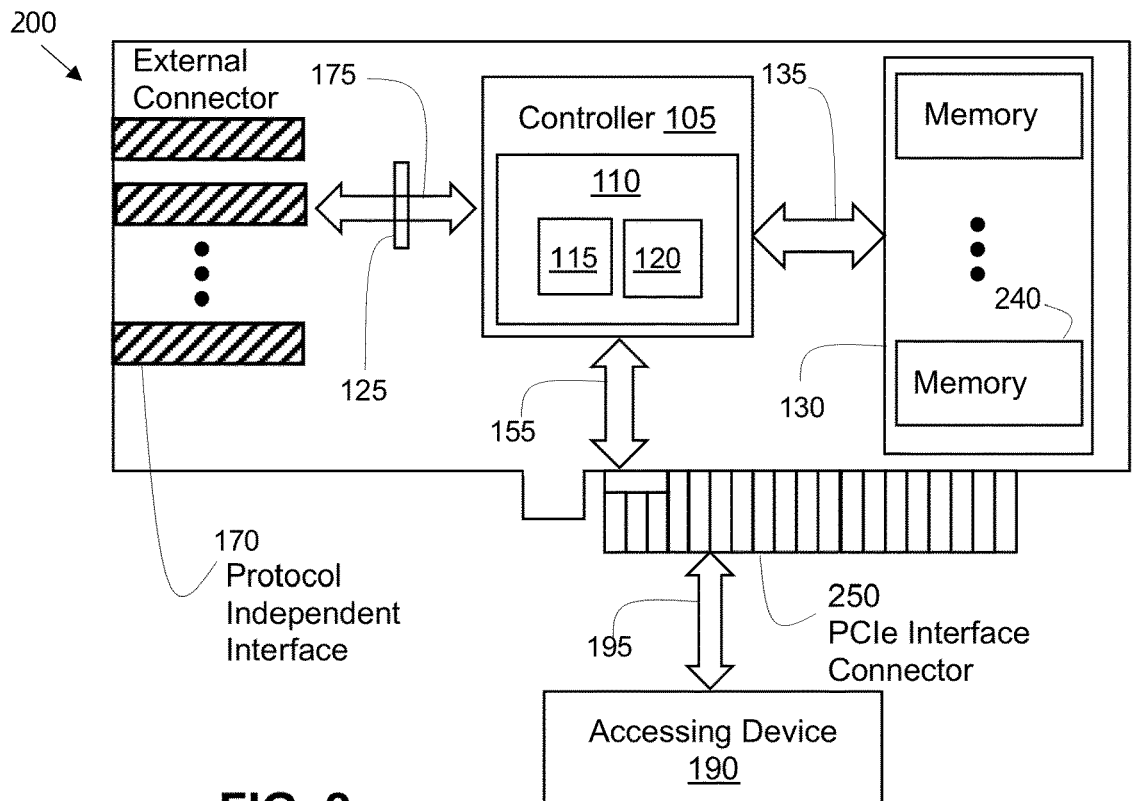
FIG. 2 illustrates a block diagram of an example implementation of the device 100 of FIG. 1A where the device I/F includes a PCIe I/F connector, according to an embodiment.
Figure 3:
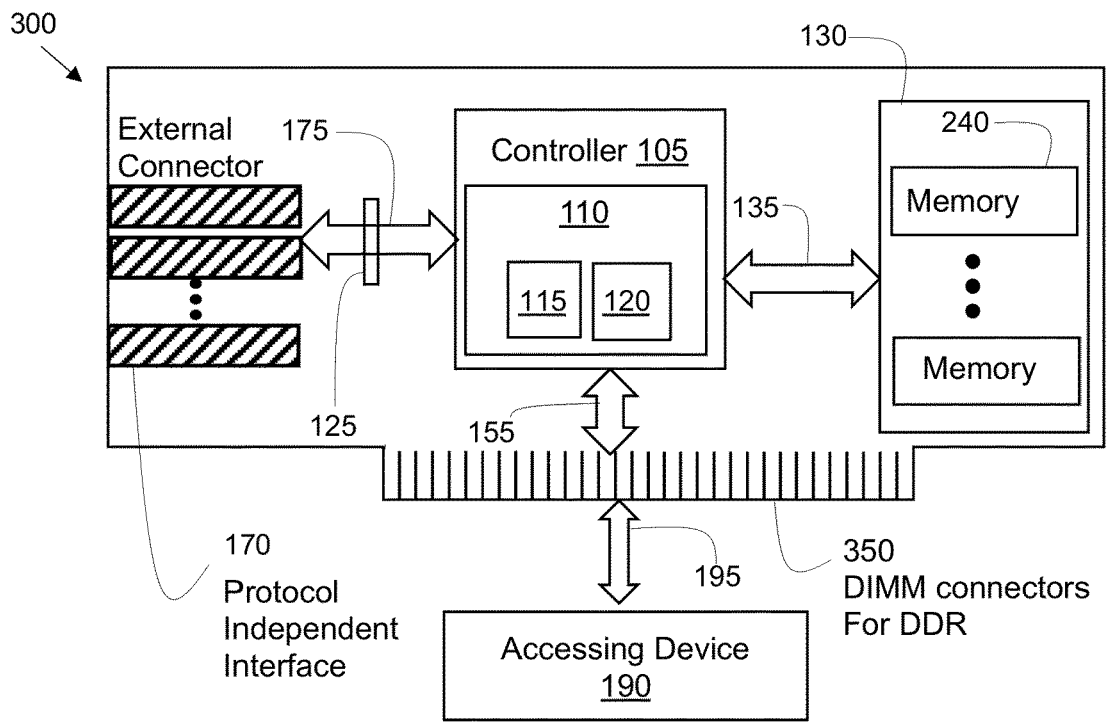
FIG. 3 illustrates a block diagram of an example implementation of the device 100 of FIG. 1A where the device I/F includes a DIMM interface connector for double data rate (DDR), according to an embodiment.

FIG. 2 illustrates a block diagram of an example implementation of the device 100 of FIG. 1A where the device I/F includes a PCIe I/F connector, according to an embodiment. In FIG. 2, a device 200 is shown as a card including the controller 105; the protocol-independent I/F 170 coupled to the controller 105 via the communication path 175; the memory 130 coupled to the controller 105 via the communication path 135; and a device I/F coupled to the controller 105 via the communication path 155 and to the accessing device 190 via the communication path 195. In the embodiment shown in FIG. 2, the device I/F is shown as PCIe I/F connector 250. The controller 105 includes the protocol translation module 110. While not shown in FIG. 2, it should be appreciated that the protocol translation module 110 includes the translator module 115 and the trainer module 120 as described in FIG. 1A. In addition, FIG. 3 illustrates a block diagram of an example implementation of the device 100 of FIG. 1A where the device I/F includes a DIMM interface connector for double data rate (DDR), according to an embodiment. In FIG. 3, a device 300 is shown as a card including the controller 105; the protocol-independent I/F 170 coupled to the controller 105 via the communication path 175; the memory 130 coupled to the controller 105 via the communication path 135; and a device I/F coupled to the controller 105 via the communication path 155 and to the accessing device 190 via the communication path 195. In the embodiment shown in FIG. 3, the device I/F is shown as a DIMM interface connector 350 for DDR. The device 300 shown in FIG. 3 is similar to the device 200 in FIG. 2 with the exception that the device I/F is a DIMM connector for DDR. FIGS. 2 and 3 are described herein together. It should be appreciated that the discussion above for similar features and function of the device 100 of FIG. 1 may also apply to the devices 200 and 300 shown in FIGS. 2 and 3. For the sake of brevity and clarity, every feature and function applicable to FIG. 1 is not repeated here for FIGS. 2 and 3.

In FIGS. 2 and 3, the memory 130 is shown as a memory array including a cluster of memories 240. The memory 130 may include a flash memory, such as a NAND flash memory, or a resistive memory, such as a resistive random access memory (ReRAM), 3D-Xpoint, as illustrative, non-limiting examples. In some implementations the memory 130 may have a three-dimensional (3D) memory configuration. As an example, the memory 130 may have a 3D vertical bit line (VBL) configuration. In a particular implementation, the memory 130 is a non-volatile memory having a 3D memory configuration that is monolithically formed in one or more physical levels of arrays of memory cells having an active area disposed above a silicon substrate. Alternatively, the memory 130 may have another configuration, such as a two-dimensional (2D) memory configuration, a monolithic 3-D memory, or a non-monolithic 3D memory configuration (e.g., a stacked die 3D memory configuration). The memories 240 may include one or more memory dies, memory cards, or other storage devices.

The controller 105 is configured to receive data from the accessing device 190 via the communication path 195, the PCIe I/F connector 250 as shown in FIG. 2 (or the DIMM interface 350 for DDR as shown in FIG. 3), and the communication path 155. The controller 105 can write or read data to or from the memory 130 using the communication path 135. The device 200 can include the switch 125 that can enable and disable the signal lines on the communication path 175 and the contacts (e.g., pins) on the protocol-independent I/F 170 based on a target protocol selected with the switch 125. For example, during installation of the device 200 when the protocol-independent I/F 170 is being coupled to a network adapter and communication port of a specific protocol technology (e.g., Ethernet, Fibre Channel, SATA, Bluetooth, or another wired or wireless communication protocol), a system administrator can set the switch to select the target protocol required by the network adapter such that the corresponding channel is enabled through the protocol-independent I/F 170. For example, if the protocol-independent I/F has a 32-pin connector, but the selected target protocol requires a 16-bit channel, then the appropriate 16 contacts of the protocol-independent I/F are enabled to form the 16-bit channel. In an embodiment, the administrator can also couple an adaptor (e.g., the adapter 101 of FIG. 1) to the protocol-independent I/F 170 to provide a connector with the specific form factor that is required for data transmission to the network adapter. For example, if the protocol-independent I/F has a 32-pin connector, but the selected target protocol and electrical bus to the network adaptor require a 16-pin connector, the adapter can include a 32-pin connector to connect to the protocol-independent I/F 170 and a 16-pin connector to connect to the electrical bus to the network adapter. In this way, the adapter converts the enabled 16 contacts of the protocol-independent interface 170 to the form factor of the 16-pin connector. In some implementations, the adapter can connect to the protocol-independent I/F 170 and straight into the network adapter. Once the target protocol is selected, an indication of the selected target protocol can be sent to the device controller 105 so that the trainer module 120 can train the translator module 115. For example, the indication of the selected target protocol can be sent by the system administrator to the controller 105 from the accessing device 190. In an embodiment, the indication of the selected target protocol includes training instructions for the selected target protocol. For example, the training instructions can be sent to the device 100 via the PCIe I/F connector 250 of FIG. 2 (or the DIMM connector 350 for DDR of FIG. 3) and the communication path 195. The trainer module 120 receives the training instructions for the selected target protocol and executes the training instructions in order to train the translator module 115 to format data according to the parameters for the selected target protocol. The controller 105 is then configured to transmit the formatted data through the protocol-independent I/F 170 for transmission by the network adapter and communication port coupled to the protocol-independent I/F 170. In another embodiment, the indication of the selected target protocol includes information identifying the selected target protocol and is absent the training instructions. The trainer module 120 can, for example, be preprogrammed with instructions on retrieving the training instructions for various target protocols; or alternatively, instructions for retrieving the training instructions can be included with the information identifying the selected target protocol. The trainer module 120 can retrieve the training instructions from memory (e.g., the on-controller memory or the memory 130) and execute the training instructions to train the translator module 115. Once trained, the translator module 115 can format data according to the target protocol selected for data transmission via the protocol-independent I/F 170. In another embodiment, the trainer module 120 can be configured to detect when the switch 125 is set to one of the target protocols and which target protocol is selected. When the system administrator selects a target protocol with the switch 125, for example, the trainer module 120 detects the selected target protocol and retrieves the corresponding training instruction from the memory to train the trainer module 115. Once trained, the translator module 115 can reformat data received from the PCIe I/F connector 250 of FIG. 2 (or the DIMM connector 350 for DDR of FIG. 3) for transmission from the network adapter and communication port via the protocol-independent I/F 170. For example, data received from the accessing device (e.g., via the PCIe interface 250 in FIG. 1 or the DIMM interface for DDR in FIG. 2) can be decoded and extracted and subsequently reformatted by the translator module 115 for the target protocol and transmitted through the protocol-independent I/F 170. It should be appreciated that the devices 200 and 300 shown in FIGS. 2 and 3 as a card with the PCIe I/F 250 and a card with DIMM I/F 350 for DDR, respectively, are illustrative examples and that other variations of the devices, the interfaces, and the applicable protocols can exist in other embodiments.

Figure 4:
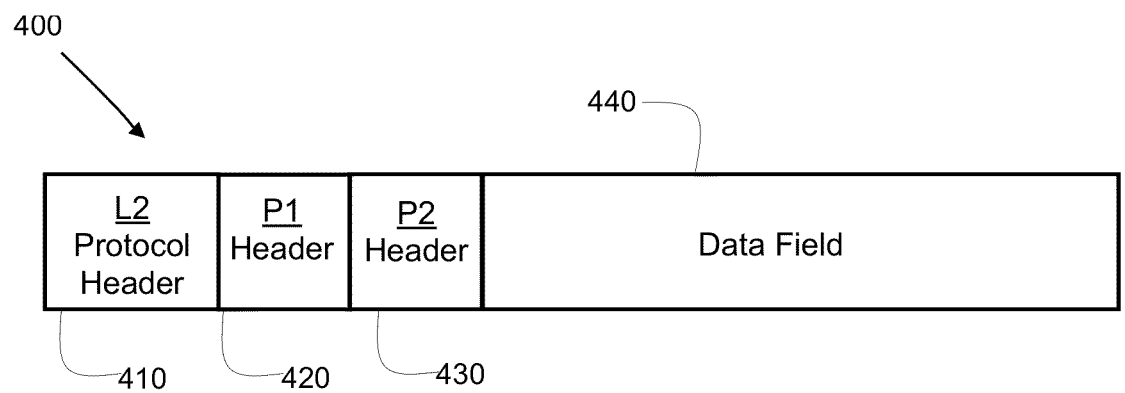
FIG. 4 illustrates an example data frame (or data packet) that can be sent by the accessing device 190 and received by the controllers 105 of FIGS. 1-3, according to an embodiment.

As described above, once the translator module 115 has been trained on the selected target protocol, the controller 105 is configured to receive data from the accessing device and reformat the data for transmission from the network adapter and communication port coupled to the protocol-independent I/F 170. FIG. 4 illustrates an example data frame (or data packet) that can be sent by the accessing device 190 and received by the controllers 105 of FIGS. 1-3, according to an embodiment. In FIG. 4, a data frame 400 is shown including a data field 440 (or data portion, payload, sub-frame, etc.) and a main header 410. The main header 410 includes the protocol header for data transmission from the accessing device 190 to the controller 105 via the device I/F 150 (e.g., PCIe for device I/F 250 in FIG. 2 and DDR for DIMM I/F 350 in FIG. 3). The data field 440 include raw data. The data frame 400 can include one or more additional headers, such as headers 420 and 430 shown in FIG. 4. In some instances, the data frame can include several protocols and their associated header information encapsulated within the data frame, which can require several levels of decoding. The headers 420 and 430 can include additional control information, or can be headers of encapsulated protocols, within the data frame 400. The headers 410, 420, and 430 can include, for instance, various information related to timing, control, decoding/encoding, error correction information, size of data, protocol specific information, etc. The additional headers 420 and 430 are exemplary and another number of headers can be included in the data packet 400 or no additional headers can be included. It should be appreciated that the embodiment show is illustrative and that in other embodiments the information in the one or more headers can be located in different areas of the data packet 400 than shown, including the data field 440. The controller 105 can include, or work in conjunction with, a decoder to decode the data frame 400 so that the data (e.g., the raw data) can be extracted from the data field 440. The translator module 115 reformats the data according to the selected target protocol for transmission through the protocol-independent I/F 170. The data can be formatted according to the specific parameters of the selected target protocol, such as the control information describe herein.

In an embodiment, during installation and setup of the device (e.g., the devices 100, 200, 300) with a network adapter and communication port, the indication of selected target protocol can be sent from the accessing device 190 to the controller 105 within the data field 440 of the data frame 400 for instance. The data frame 400 is decoded and the indication of the selected target protocol extracted so that the trainer module 120 can train the translator module 115 for the selected target protocol, as described herein.

Figure 5:
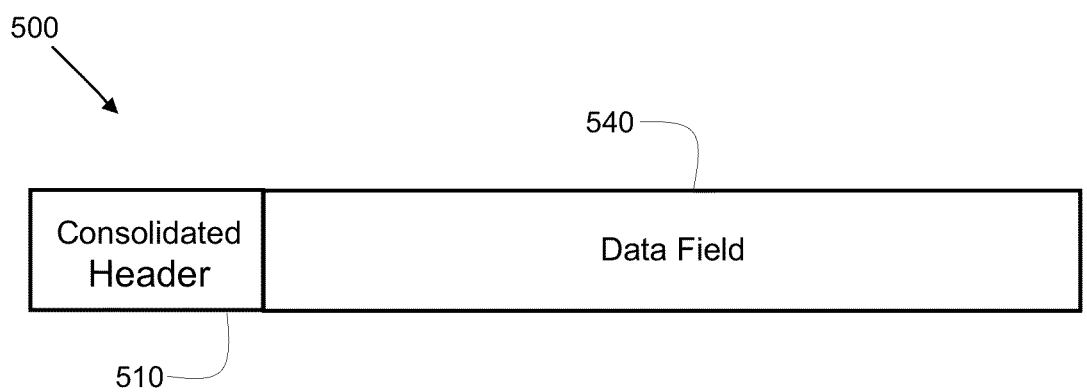
FIG. 5 illustrates an example reformatted data frame after the translator module 115 has reformatted the data frame 400 of FIG. 4, according to an embodiment.

FIG. 5 illustrates an example reformatted data frame after the translator module 115 has reformatted the data frame 400 of FIG. 4, according to an embodiment. In FIG. 5, a data frame 500 is shown including a new header 510 specific to the selected target protocol for the protocol-independent I/F 170. The new header 510 can include, for example, various information related to timing, control, decoding/encoding, error correction information, size of data, protocol specific information, etc. The data packet 500 includes a data field 540, which can carry the data (e.g., the raw data from the data field 440 of FIG. 4) received from the accessing device 190. In an embodiment, when the data frame 400 includes one or more protocol headers (e.g., headers 420 and 430) encapsulated within the main header 410, the translator module 115 can consolidate header information of the selected target protocol and the header information of the encapsulated protocols into the single header 510. In yet another embodiment, the translator module 115 generates the new header 510 specific to the selected target protocol for the protocol-independent I/F, and the data field 540 includes the information from the headers 420 and 430 along with the data in the data field 440.

Figure 6:
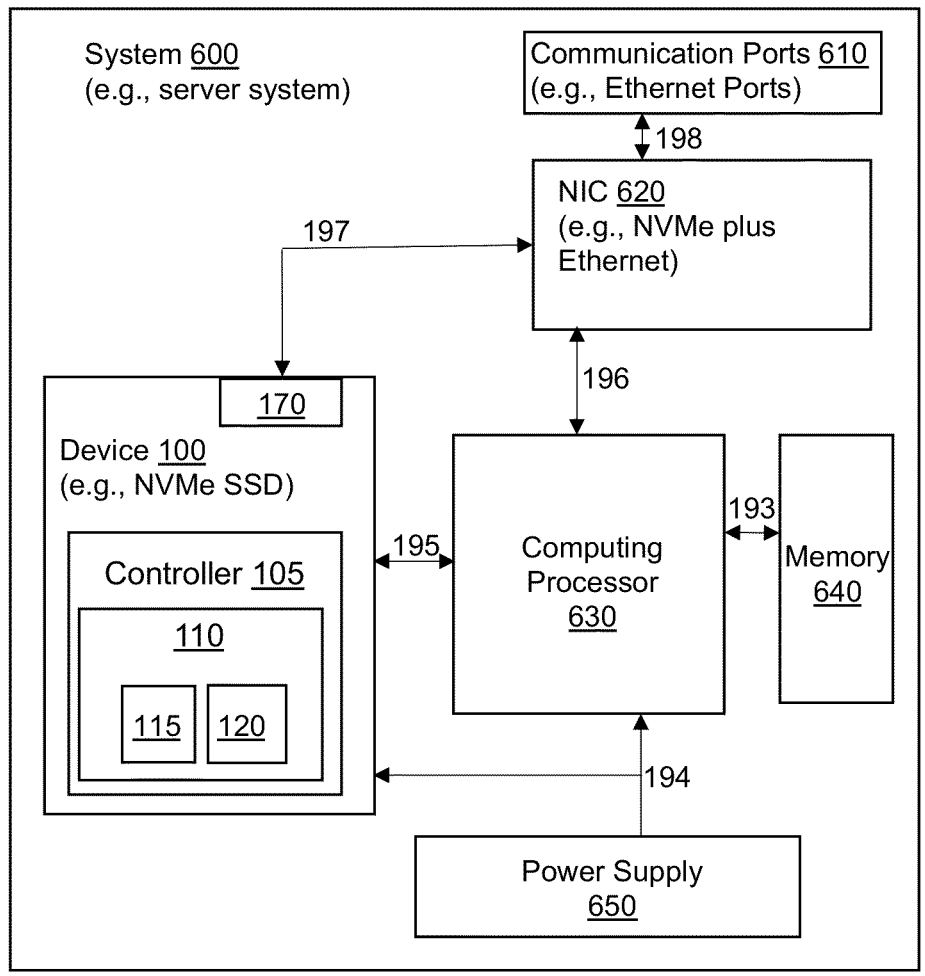
FIG. 6 illustrates a block diagram of an example system including the device 100 of FIG. 1, according to an embodiment.

FIG. 6 illustrates a block diagram of an example system including the device 100 of FIG. 1, according to an embodiment. In FIG. 6, a system 600 (e.g., server system) is shown including a processor 630 coupled to: a memory 640 via communication path 193, a power supply 650 via communication path 194; the device 100 of FIG. 1 (e.g., an SSD) via the communication path 195, and a network adapter 620 via communication path 196. The device 100 is coupled to the network adapter 620 via a communication path 197. The system 600 also includes one or more communication ports 610 coupled to the network adapter 620 via communication path 198. The communication paths 193, 194, 195,196, 197, 198 can be electrical busses for instance. The network adapter 620 can include, for example, a host bus adapter (HBA), a network interface card (NIC), or a converged network adapter (CNA).

As described herein, the device 100 includes the controller 105 having the protocol translation module 110. The protocol translation module 110 includes the translator module 115 and the trainer module 120. It should be appreciated that the components and features of the device 100 of FIG. 1, while not all shown or described for FIG. 6, are applicable here for the device 100 shown in FIG. 6. The protocol translation module 110 is shown including the translator module 115 and the trainer module 120. The trainer module 110 is configured for training the translator module 115 for the target protocol selected for the protocol-independent I/F 170, as described herein. Once trained, the translator module 115 can reformat data received at the device I/F 150 to the selected target protocol for the protocol-independent I/F 170.

In the embodiment shown in FIG. 6, the processor 630 functions as the accessing device 190 described herein. The controller 105 receives data from the processor 630 via the device I/F 150 and the communication path 195. The device I/F 150 can include a variety of connectors, form factors, protocols, etc., such as the PCIe interface 250 in FIG. 2 or the DIMM interface 350 for DDR in FIG. 3.

The device 100 can be configured for data transmission using multiple types of network adapters 620 and the communication ports 610 requiring different target protocols through the protocol-independent interface 170. Depending on the target protocol required for the desired network adapter 620 and communication ports 610, the device 100 can be configured for data transmission according to the required target protocol for data transmission through the protocol-independent interface 170. For instance, a system administrator can use the switch 125 (not shown in FIG. 6) to choose from multiple target protocols settings and select the target protocol required for data transmission to the network adapter 620 from the protocol-independent I/F.

Different design applications may call for various types of communication ports 610 and network adapters 620 requiring different target protocols. The device 100 provides the flexibility to accommodate the needs of such different design applications and target protocols. In this way, a single design for the device 100 can be manufactured and sold to clients with different design applications, who can then customize the device 100 to operate with the desired network adapter and communication ports for their application. As an illustrative example, one design application may call for the communication ports 610 to be Ethernet ports and the network adapter 620 to be a network interface controller (NIC), such as a NVMe plus Ethernet NIC. For instance, the NVMe plus Ethernet NIC 620 is coupled to the Ethernet ports 610 via the communication path 198 and to the device 100 via the communication path 197. Accordingly, the target protocol through the protocol-independent interface I/F 170 of the device 100 can be selected as the target protocol required of the NVMe plus Ethernet NIC 620. PCIe or Ethernet may, for instance, be utilized for communication between the NVMe plus Ethernet NIC 620 and the controller. The system administrator can set the switch 125 to the corresponding NVMe setting to select the target protocol. Once the target protocol is selected, an indication of the selected target protocol can be sent to the controller 105 of the device 100 (e.g., by the system administrator from the processor 630). If the indication includes the training instructions, the trainer module 120 can execute the training instructions to train the translator module 115 to format data according to the selected target protocol required for the NVMe plus Ethernet NIC 620. Once the translator module 115 is trained, data received from the processor 630 can be reformatted and subsequently transmitted through the protocol-independent I/F 170 for transmission from the network adapter 620 and the communication ports 610. As described herein, if the indication of the target protocol is absent the training instructions the trainer module 120 can retrieve the training instructions from memory (e.g., the on-controller memory (not shown) or the memory 640).

Figure 7:
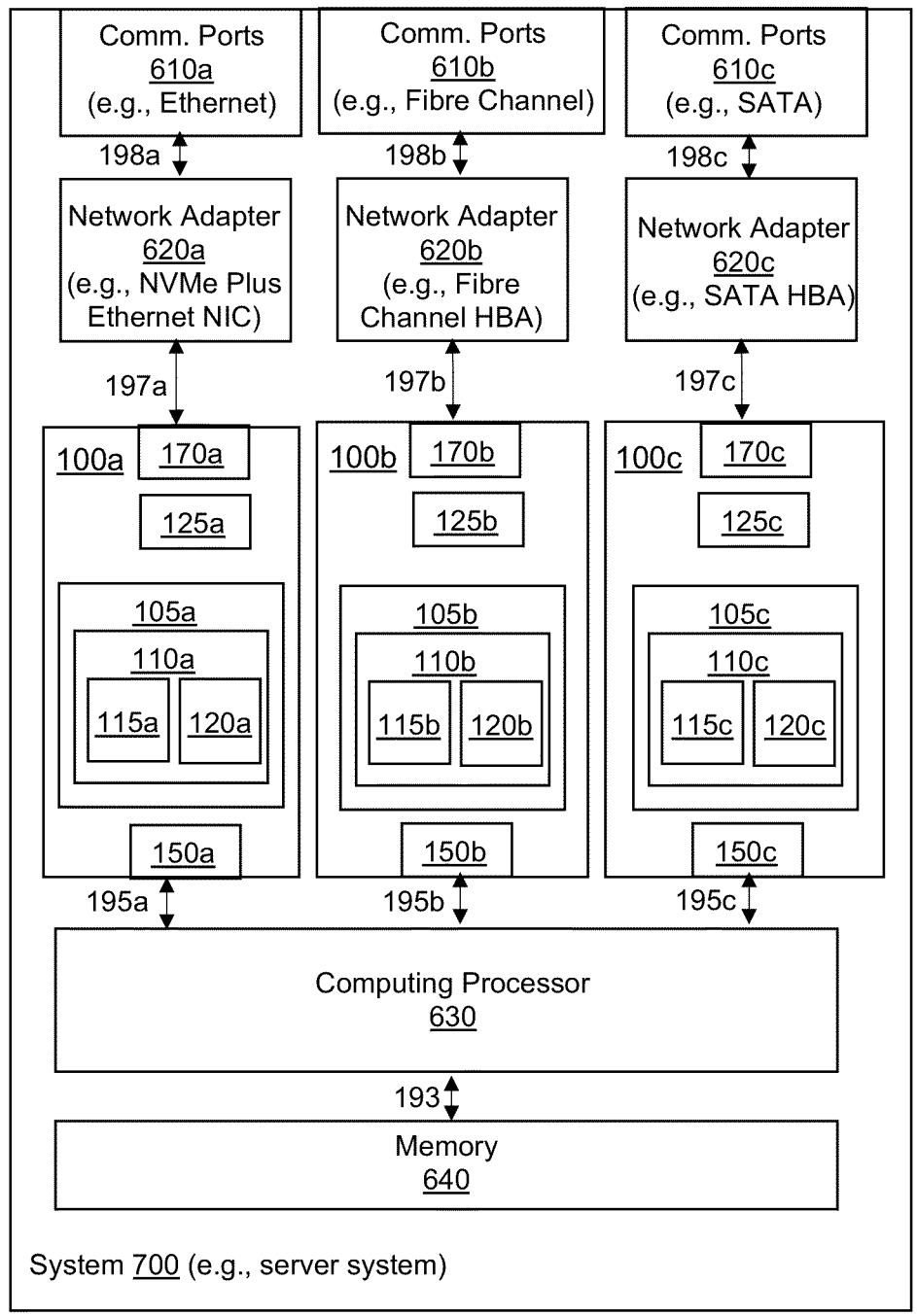
FIG. 7 illustrates a block diagram of a system resulting from modifying the system 600 to utilize multiple devices 100 to provide different target protocols for multiple types of network adapters and communication ports, according to an embodiment.

A design application may also call for multiple types of communication ports 610 and network adaptors 620 requiring various target protocols. In such case, more than one device 100 can be used, with each device 100 configured for the target protocol required of the respective communication port and network adapter. For example, in another embodiment, the system 600 can include multiple communication ports and corresponding network adapters instead of only one as shown in FIG. 6. For example, the processor 630 of the system 600 of FIG. 6 can be coupled to more than one device 100, with each device 100 implementing one of the multiple selectable target protocols for their respective protocol-independent I/F 170 depending on the design application. FIG. 7 illustrates a block diagram of a system resulting from modifying the system 600 to utilize multiple devices 100 to provide different target protocols for multiple types of network adapters and communication ports, according to an embodiment. In FIG. 7, a system 700 (e.g. 640 coupled to the processor 630 via the communication path 193, and multiple types of communications ports 610a, 610b, 610c, such as Ethernet, Fibre Channel, and SATA for example. Each of the communication ports 610a, 610b, 610c are coupled to respective network adapter 620a, 620b, 620c (e.g., a NVMe plus Ethernet NIC, a Fibre Channel HBA, and a SATA HBA, respectively, for the example communication ports 620a, 620b, 620c) via the communication paths 198a, 198*b*, 198*c*, respectively. Multiple devices 100 can be used for the communication ports 620*a*, 620*b*, 620*c* called for in the design application. For instance, in the example provided, the processor 630 can be coupled to: a device 100*a* coupled to the NVMe plus Ethernet NIC 620*a*, which is coupled to the one or more Ethernet ports 610*a*; a device 100*b* coupled to the Fibre Channel HBA 620*b*, which is coupled to the one or more Fibre Channel ports 610*b*; and, a device 100*c* coupled to the SATA HBA 620*c*, which coupled to the one or more SATA ports 610*c*. The protocol-independent I/Fs 170*a*, 170*b*, 170*c* of the devices 100*a*, 100*b*, 100*c* are coupled to the network adapters 620*a*, 620*b*, 620*c* via communication paths 197*a*, 197*b*, 197*c*, respectively.

The devices 100*a*, 100*b*, 100*c* include controllers 105*a*, 105*b*, 105*c* that have protocol translation modules 110*a*, 110*b*, 110*c*, respectively. The protocol translation modules 110*a*, 110*b*, 110*c* include translator modules 115*a*, 115*b*, 115*c* and trainer modules 120*a*, 120*b*, 120*c*, respectively. The controllers 105*a*, 105*b*, 105*c* are coupled to the processor 630 via device I/Fs 150*a*, 150*b*, 150*c* and communication paths 195*a*, 195*b*, 195*c*, respectively. The devices 100*a*, 100*b*, 100*c* are also shown including switches 125*a*, 125*b*, 125*c* that are inserted along the communication path (not shown) from the controllers 105*a*, 105*b*, 105*c* and the protocol-independent I/Fs 170*a*, 170*b*, 170*c*, respectively. The switches 125*a*, 125*b*, 125*c* can be set to one of multiple selectable target protocols for the protocol-independent I/Fs 170*a*, 170*b*, 170*c*, in order to enable and disable the appropriate signal lines in the communication path to between the controllers 105*a*, 105*b*, 105*c* and the protocol-independent I/F 170*a*, 170*b*, 170*c* according to each selected target protocol (e.g., NVMe, Fibre Channel, and SATA, respectively), respectively. In this way, the corresponding contacts of the protocol-independent I/Fs 170*a*, 170*b*, 170*c* can be enabled or disabled accordingly to form the corresponding channel for the selected target protocols. Once the switches 125*a*, 125*b*, 125*c* are set to selected target protocols (e.g., NVMe, Fibre Channel, and SATA, respectively) for the protocol-independent I/Fs 170*a*, 170*b*, 170*c*, indications of the selected target protocols can be sent to the controllers 105*a*, 105*b*, 105*c* so that the trainer modules 120*a*, 120*b*, 120*c* can train the translator modules 115*a*, 115*b*, 115*c* to reformat data from the processor 630 to the selected target protocol formats for the protocol-independent I/Fs 170*a*, 170*b*, 170*c*, respectively. For example, the system administrator can send the indications of the target protocols via the processor 630. The indications of the selected target protocols can include training instructions for the trainer modules 120*a*, 120*b*, 120*c* to execute to train the translator module 115*a*, 115*b*, 115*c*, respectively. In another embodiment, one or more of the indications of the selected target protocols can be absent the training instructions and the corresponding trainer modules 120*a*, 120*b*, 120*c* can be configured to retrieve the training instructions from memory (e.g., on-controller memory or the memory 640) before executing the training instructions. For example, the trainer modules 120*a*, 120*b*, 120*c* can be preprogrammed to retrieve the selected target protocol from the memory, or alternatively the indication of the selected target protocol can include instructions for retrieving the training instructions. In an embodiment, the trainer modules 120*a*, 120*b*, 120 can be preprogrammed to automatically detect the selections of the target protocols with the switches 125*a*, 125*b*, 125*c* and retrieve the corresponding training instruction from the memory. It should be appreciated that the previous discussion above for similar features and functions of the device 100 in FIG. 1 (or the devices 200, 300, 600 in FIGS. 2,3,6 respectively) can also apply here to the devices 100*a*, 100*b*, 100*c* shown in FIG. 7. For the sake of brevity and clarity, not every feature and function has not been repeated here for FIG. 7 but may still be applicable. For instance, it should be appreciated that the communication path 175 of the device 100 in FIG. 1, although not shown in FIG. 7, can be included in each of the devices 100*a*, 100*b*, 100*c* to couple each of the controllers 105*a*, 105*b*, 105*c* to the switches 125*a*, 125*b*, 125*c* and the protocol-independent I/Fs 170*a*, 170*b*, 170*c*, respectively.

FIG. 8 illustrates a flowchart for an example method of setting up a protocol-independent I/F for a selected target protocol and reformatting data based upon the selected target protocol for transmission through the protocol-independent I/F, according to an embodiment. Throughout the description for FIG. 8, examples are provided with reference to FIGS. 1-7 to facilitate understanding. It should be appreciated that the previous discussion above for similar features and functions of FIGS. 1-7 can also apply here and that, for the sake of brevity and clarity, every feature and function has not been repeated here for FIG. 8 but may still be applicable.

At block 805 of method 800, a storage device having a protocol-independent I/F and protocol translation module (e.g., the devices 100, 200, 300, 600, 700 having corresponding protocol-independent I/Fs 170, 170*a*, 170*b*, 170*c* and protocol translation modules 110, 110*a*, 110*b*, 110*c* described for the previous figures) is provided for installation and setup within a system. The storage device includes the device I/F (e.g., the device I/Fs 150, 250, 350 described for the previous figures) used to receive data from the accessing device (e.g., the accessing device 190, 630 described for the previous figures) using any of a variety of connectors, form factors, protocols, etc. For example, the device I/F 150 may include PCIe based SSDs, M.2 form factor, U.2 form factor, SATA or SAS, DIMM, USB drives, SD cards, MicroSD cards, packaged die products, etc. The protocol-independent I/F is configured for coupling to any one of multiple types of network adapters and communication ports that require different connectors, form factors, and target protocols, etc. The specific network adapters and communication ports implemented within the storage system can vary based on the design application of the storage system.

At block 810, a specific type of network adapter and communication port can be selected and coupled to the storage device. The protocol-independent I/F can be configured to couple the storage device to various types of network adapters and communication ports, which can each require different target protocols. The target protocol may include, for example, wired or wireless communication protocols, such as various generations of Ethernet, Fibre Channel, SATA, Bluetooth, SCSI, or other target protocols. At block 815, the target protocol required for the protocol-independent I/F can be determined (or identified) based on the type of network adapter and communication port selected. Blocks . . . can be performed by a system administrator or other technician can determine the required target protocol for the protocol-independent I/F based on the type of network adapter and communication port implemented.

The protocol-independent I/F includes a plurality of contacts that are coupled to the controller (e.g., the controllers 105, 105*a*, 105*b*, 105*c* described for the previous figures) by a plurality of signal lines (e.g., signal lines of the communication path 175 described for previous figures) that enable data transmission from the controller to the protocol-independent interface. Different channels for each selectable target protocol can be formed by enabling and disabling the appropriate signal lines and corresponding contacts on the protocol-independent I/F as required for the selectable target protocols. The protocol-independent I/F can include, for example, a generic connector having a sufficient number of contacts (e.g., pins) to accommodate the selectable target protocol requiring the most signal lines or contacts. A switch (e.g., the switches 125, 125*a*, 125*b*, 125*c* described for the previous figures) can be inserted along the plurality signal lines from the controller to the protocol-independent I/F. The switch enables selection of one of multiple target protocols for data transmission through the protocol-independent I/F. The switch enables and disables each of the signal lines of the plurality of signal lines and each of the contacts of the plurality of contacts to form different channels through the protocol-independent I/F for each of the selectable target protocols. The switch can be implemented in hardware, software, or a combination of both in different embodiments. At block 820, the switch is set to select a target protocol and form a corresponding channel through the protocol-independent I/F for the selected target protocol. When the target protocol is selected with the switch, the switch enables and disables the specific signal lines between the controller and the protocol-independent I/F to accommodate the selected target protocol, which in turn enables and disables the corresponding contacts on the protocol-independent I/F to form the corresponding channel. In an embodiment, an adaptor can be coupled to the protocol-independent I/F to provide the specific form factor of the standard connection required for the communication path (e.g., electrical bus) of the selected target protocol.

At block 820, an indication of the selected target protocol can be sent to the storage device. The indication can include training instructions (e.g., the training instructions described for the previous figures) for the trainer module (e.g., the trainer modules 120, 120*a*, 120*b*, 120*c* described for the previous figures) to execute to train the translator module (e.g., the translator modules 115, 115*a*, 115*b*, 115*c* described for the previous figures) to format data according to the selected target protocol. In another embodiment, the indication of the selected target protocol includes information identifying the selected target protocol and is absent the training instructions.

In an embodiment, blocks 805, 810, 815, 820, and 825 can be performed by a system administrator or technician, for example, to install the storage device and setting up the protocol-independent I/F for the desired network adapter and communication port. The switch can be, for instance, an electronic switch that can be manually set by the system administrator during installation and setup to select the target protocol required for the protocol-independent I/F. In some instances, the switch can be a software switch that is set by the administrator to the selected target protocol during installation and setup.

For some design applications and systems, multiple storage devices can be implemented for different types of network adapters and communication ports, in which case the blocks 805, 810, 815, 820, and 825 can be performed for each storage device and corresponding network adapter and communication port. For example, the blocks 805, 810, 815, 820, and 825 can be performed for each of the storage devices 100*a*, 100*b*, 100*c* in FIG. 7 to setup the storage device for communication with the NVMe Plus Ethernet NIC 620*a*, Fibre Channel HBA 620*b*, and SATA HBA 620*c*, respectively.

At block 830, the indication of the selected target protocol is received by the trainer module. If the indication of the selected target protocol includes training instructions for the selected target protocol, the trainer module executes the training instructions (e.g., performs a training sequence based upon the training instructions) to train the translator module to format data according to the selected target protocol. If the indication of the selected target protocol includes information identifying the selected target protocol and is absent the training instructions, the trainer module can retrieve the training instructions from memory (e.g., the on-controller memory or the memory 130, 640 described in previous figures). For example, the trainer module can be preprogrammed to retrieve the training instructions from memory based on the information identifying the selected target protocol. Alternatively, instructions for retrieving the training instructions can be included with the information identifying the selected target protocol so that the trainer module can execute the instructions to retrieve the training instructions from the memory. In yet another embodiment, the trainer module is preprogrammed to automatically detect the selection of the target protocol with the switch and retrieve the corresponding training instruction from the memory.

At block 835, the training instructions for the selected target protocol are executed by the trainer module to train the translator module to format data according to the selected target protocol. Once trained, the translator module can format data for transmission through the protocol-independent I/F according to the parameters of the selected target protocol. The storage device is now setup for data transmission from the network adapter and communication port coupled to the protocol-independent I/F.

At block 840, data is received from the device I/F of the storage device. The storage device can receive, for example, data from the accessing device (e.g., the accessing device 190 and the processor 630 described for the previous figures) via the device I/F. The data received from the accessing device is formatted according to the protocol required by the communication path (e.g., the communication paths 195, 195*a*, 195*b*, 195*c* described in the previous figures) between the accessing device and the storage device, which can be different than the target protocols for the protocol-independent I/F.

At block 845, the data received from the device I/F is reformatted according to the target protocol. For example, the data can be included within a data frame or packet (e.g., the raw data in the data field 440 of the data frame 400 of FIG. 4). The data frame can be decoded by a decoder, for instance, and the data extracted. Once extracted, the translator module can reformat the data according to the selected target protocol. For example, the data can be reformatted according to the specific parameters required by the selected target protocol, such as control information including the size of data, timing parameters, data rates, error correction codes, which signal lines from the controller 105 to the protocol-independent I/F 170 are to be enabled, and which signals are to be transmitted on which enabled signal lines from the controller 105 to the protocol-independent interface 170, etc. The reformatted data can be included within a new data frame with header information specific for the selected target protocol, such as the data frame 500 shown in FIG. 5 for instance. Once the data has been reformatted for the selected target protocol, the reformatted data can be sent through the protocol-independent I/F 170 for transmission from the network adapter and communication port, as represented by block 850

For some design applications and systems, multiple storage devices can be implemented for different types of network adapters and communication ports (e.g., the system 700 of FIG. 7), in which case the blocks 830 and 835 can be performed for each storage device to train the translator modules for the selected target protocols of each implemented network adapter and communication port. Thereafter, data that is received from the device I/F can be transmitted from any desired network adapter and communication port implemented. For example, the blocks 840, 845, and 850 can be performed by the storage device coupled to the desired network adapter and communication port.

In an embodiment, the accessing device can determine which communication port the data is intended to be transmitted from, and then send the data to the corresponding storage device coupled to that communication port. For example, the processor 630 of FIG. 7 can determine which communication port 610a, 610b 610c the data is to be transmitted from, identify which storage device is coupled to the desired communication port, and then transmit the data to that appropriate storage device via one of the communication paths 195a, 195b, 195c.

Figure 9:
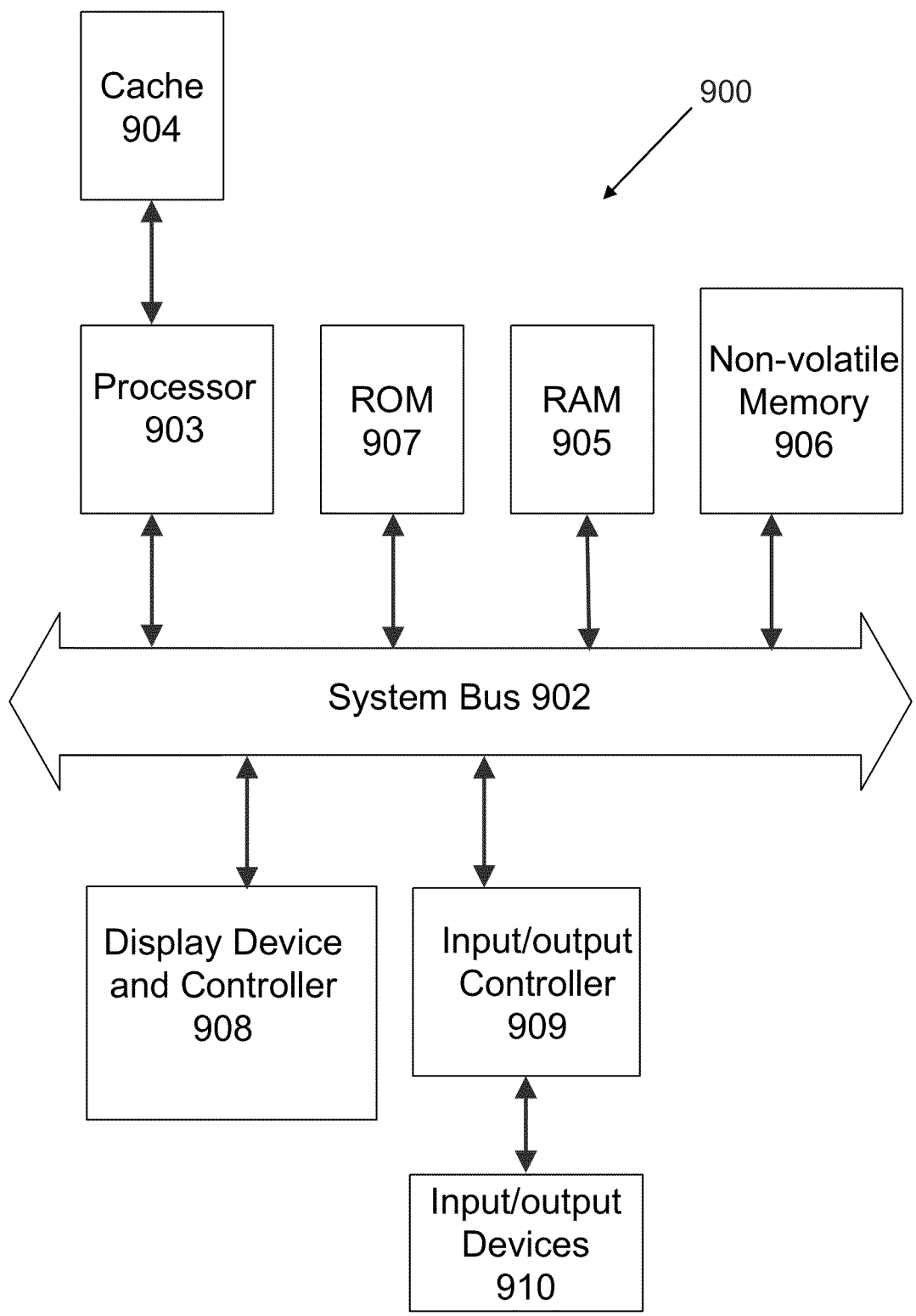
FIG. 9 depicts a block diagram of an exemplary host system (or computer system), according to an embodiment.

FIG. 9 depicts a block diagram of an exemplary host system (or computer system), according to an embodiment. Note that while FIG. 9 illustrates various components of a computer system, it is not intended to represent any particular architecture or manner of interconnecting the components. The computer system 900 shown in FIG. 9 may represent an example accessing device (e.g., one of the accessing devices described in FIGS. 1 through 8), such as a server for example. It is also be appreciated that networked computers and other data processing systems which have fewer components, or perhaps more components, may also be implemented as the computer system.

As shown, the host system 900 includes a system bus 902, which is coupled to a microprocessor 903, a Read-Only Memory (ROM) 907, a volatile Random Access Memory (RAM) 905, as well as other nonvolatile memory 906. In the illustrated embodiment, microprocessor 903 is coupled to cache memory 904. A system bus 902 can be adapted to interconnect these various components together and also interconnect components 903, 907, 905, and 906 to other devices, such as a display controller and display device 908, and to peripheral devices such as input/output ("I/O") devices 910. Types of I/O devices can include keyboards, modems, network interfaces, printers, scanners, video cameras, or other devices well known in the art. Typically, I/O devices 910 are coupled to the system bus 902 through I/O controllers 909. In one embodiment the I/O controller 909 includes a Universal Serial Bus ("USB") adapter for controlling USB peripherals or other type of bus adapter.

RAM 905 can be implemented as dynamic RAM ("DRAM"), which requires power continually in order to refresh or maintain the data in the memory. The other nonvolatile memory 906 can include a magnetic hard drive, magnetic optical drive, optical drive, DVD RAM, solid-state storage drive, or other type of memory system that maintains data after power is removed from the system. While FIG. 9 shows that nonvolatile memory 906 as a local device coupled with the rest of the components in the host system 900, it will be appreciated by skilled artisans that the described techniques may use a nonvolatile memory remote from the system, such as a network storage device coupled with the host system through a network interface, such as a modem, Ethernet interface, or any other standard or proprietary interface.

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations; or operations in an order. Accordingly, the scope and spirit of the invention should only be judged in terms of any accompanying claims that may be appended, as well as any legal equivalents thereof.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, embodiments other than those specific described above are equally possible within the scope of any accompanying claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

For purposes of explanation, numerous specific details are set forth in order to provide a thorough understanding of the description. It should be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein. It should be appreciated that the block diagrams may include additional components that are not necessarily shown or described, but which have been left out for the sake of clarity and brevity.

Various components and modules described herein may include software, hardware, or a combination of software and hardware. The components and modules may be implemented as software modules, hardware modules, special-purpose hardware (e.g., application specific hardware, ASICs, DSPs, etc.), embedded controllers, hardwired circuitry, hardware logic, etc. Software content (e.g., data, instructions, and configuration) may be provided via an article of manufacture including a non-transitory, tangible computer or machine-readable storage medium, which provides content that represents instructions that can be executed. The content may result in a computer performing various functions/operations described herein.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory that, when read and executed by a processor, cause the processor to perform operations to execute the processes and features described herein. The processes and features described herein may be implemented in software, firmware, hardware (e.g., an application specific integrated circuit, or a field-programmable gate array (FPGA)), or any combination thereof.

In an implementation, the processes and features described herein may be implemented as a series of executable modules run by a processor (e.g., in a computer system, individually or collectively in a distributed computing environment). The foregoing modules may be realized by hardware, executable modules stored on a computer-readable medium (or machine-readable medium), or a combination of both. For example, the modules may comprise a plurality or series of instructions to be executed by a processor in a hardware system. Initially, the series of instructions may be stored in memory, such as on a storage device. However, the series of instructions can be stored on any suitable computer readable storage medium. Furthermore, the series of instructions need not be stored locally, and could be received from a remote storage device, such as a server on a network, via the network interface. In various implementations, a module or modules can be executed by a processor or multiple processors in one or multiple locations, such as multiple servers in a parallel processing environment A computer or machine readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.); or any type of medium suitable for storing, encoding, or carrying a series of instructions for execution by a processor to perform any one or more of the processes and features described herein. The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

What is claimed is:

1. A solid-state storage device comprising:
  a controller;
  non-volatile memory coupled to the controller, wherein the controller is configured to perform read and write commands on the non-volatile memory;
  a device interface coupled to the controller, wherein the controller is further configured to receive data formatted according to a first protocol from an accessing device via the device interface; and
  a protocol-independent interface coupled to the controller and configured to couple to any one of a plurality of network adapters and communication ports so as to enable the controller to transmit data from the any one of the plurality of network adapters and communication ports, wherein each of the plurality of network adapters and communication ports require a different target protocol for data transmission through the protocol-independent interface, and wherein each of the target protocols is also different from the first protocol;
  wherein the protocol-independent interface comprises a plurality of contacts, wherein the plurality of contacts are coupled to the controller by a plurality of signal lines that enable data transmission from the controller to the protocol-independent interface; and
  wherein each of the signal lines of the plurality of signal lines and each of the contacts of the plurality of contacts are configured to be enabled or disabled to form different channels through the protocol-independent interface for each of the target protocols.

2. The solid-state storage device of claim 1, further comprising a switch coupled to the protocol-independent interface and configured to enable selection of any of the target protocols for data transmission through the protocol-independent interface;
  wherein the switch is further configured to enable or disable each of the signal lines of the plurality of signal lines and each of the contacts of the plurality of contacts to form the different channels through the protocol-independent interface based on the selection of the switch.

3. The solid-state storage device of claim 2, wherein the controller is further configured to:
  receive an indication of a first target protocol selected with the switch for data transmission through the protocol-independent interface, wherein the indication comprises training instructions for training the controller to reformat data according to the selected first target protocol; and
  execute the training instructions to train the controller to reformat data according to the selected first target protocol.

4. The solid-state storage device of claim 3, wherein the first target protocol is selected based on a first network adapter and a first communication port coupled to the protocol-independent interface, wherein each of the signal lines of the plurality of signal lines and each of the contacts of the plurality of contacts are further configured to be enabled or disabled to form a first channel through the protocol-independent interface based on the selected first target protocol, and wherein the controller is configured to:
  receive first data formatted according to the first protocol from the accessing device via the device interface;
  reformat the first data according to the selected first target protocol; and
  transmit the reformatted first data through the protocol-independent interface via the enabled signal lines of the plurality of signal lines and the enabled contacts of the plurality of contacts so that the reformatted data can be transmitted from the first network adapter and the first communication port.

5. The solid-state storage device of claim 2, wherein the controller is further configured to:
  receive an indication of a first target protocol selected with the switch for data transmission through the protocol-independent interface, wherein the indication comprises information identifying the selected first target protocol and is absent the training instructions for training the controller to reformat data according to the selected first target protocol;

retrieve the training instructions from an on-controller memory or the non-volatile memory; and execute the training instructions to train the controller to reformat data according to the selected first target protocol.

6. The solid-state storage device of claim 5, wherein the first target protocol is selected based on a first network adapter and a first communication port coupled to the protocol-independent interface, wherein each of the signal lines of the plurality of signal lines and each of the contacts of the plurality of contacts are further configured to be enabled or disabled to form a first channel through the protocol-independent interface based on the selected first target protocol, and wherein the controller is configured to:

receive first data formatted according to the first protocol from the accessing device via the device interface;

reformat the first data according to the selected first target protocol; and transmit the reformatted first data through the protocol-independent interface via the enabled signal lines of the plurality of signal lines and the enabled contacts of the plurality of contacts so that the reformatted data can be transmitted from the first network adapter and the first communication port.

7. The solid-state storage device of claim 2, wherein the switch is further configured for manual selection of any of the target protocols during setup of the solid-state storage device with the any one of the network adapters and communication ports.

8. The solid-state storage device of claim 1, wherein the controller is further configured to:

receive an indication of a first target protocol selected for data transmission through the protocol-independent interface, wherein the first target protocol is selected based on a first network adapter and a first communication port coupled to the protocol-independent interface, and wherein each of the signal lines of the plurality of signal lines and each of the contacts of the plurality of contacts are further configured to be enabled or disabled to form a first channel through the protocol-independent interface based on the selected first target protocol;

receive first data formatted according to the first protocol from the accessing device via the device interface;

reformat the first data according to the selected first target protocol; and transmit the reformatted first data through the protocol-independent interface via the enabled signal lines of the plurality of signal lines and the enabled contacts of the plurality of contacts so that the reformatted data can be transmitted from the first network adapter and the first communication port.

9. The solid-state storage device of claim 8, wherein the indication of the first target protocol comprises training instructions for training the controller to reformat data according to the selected first target protocol, and wherein the controller is further configured to execute the training instructions to train the controller to reformat data according to the selected first target protocol.

10. The solid-state storage device of claim 8, wherein the indication of the first target protocol comprises information identifying the selected first target protocol and is absent training instructions for training the controller to reformat data according to the selected first target protocol, and wherein the controller is further configured to:

retrieve the training instructions from an on-controller memory or the non-volatile memory; and execute the training instructions to train the controller to reformat data according to the selected first target protocol.

11. The solid-state storage device of claim 8, further comprising a switch coupled to the protocol-independent interface and configured to enable selection of any of the target protocols for data transmission through the protocol-independent interface;

wherein the switch is further configured to enable or disable each of the signal lines of the plurality of signal lines and each of the contacts of the plurality of contacts to form the different channels through the protocol-independent interface based on the selection of the switch.

12. The solid-state storage device of claim 11, wherein the first protocol comprises PCIe and the first communication port comprises any generation of Ethernet, Fibre Channel, or SATA.

13. The solid-state storage device of claim 1, wherein the training instructions comprise instructions for training the controller to format data according to specific formatting parameters of a selected target protocol, wherein the specific formatting parameters comprise at least one of: control information, the size of data, timing parameters, data rates, error correction codes, and signals to be transmitted on the enabled signal lines from the controller to the protocol-independent interface.

14. A method comprising:

receiving, by a controller of a solid-state storage device, an indication of a first target protocol selected for data transmission through a protocol-independent interface, wherein the solid-state storage device comprises:

the controller; and non-volatile memory coupled to the controller, wherein the controller is further configured to perform read and write commands on the non-volatile memory;

a device interface coupled to the controller, wherein the controller is configured to receive data formatted according to a first protocol from an accessing device via the device interface;

the protocol-independent interface coupled to the controller and configured to couple to any one of a plurality of network adapters and communication ports so as to enable the controller to transmit data from the any one of the plurality of network adapters and communication ports, wherein each of the plurality of network adapters and communication ports require a different target protocol for data transmission through the protocol-independent interface, and wherein each of the target protocols is also different from the first protocol;

wherein the protocol-independent interface comprises a plurality of contacts, wherein the plurality of contacts are coupled to the controller by a plurality of signal lines that enable data transmission from the controller to the protocol-independent interface; and wherein each of the signal lines of the plurality of signal lines and each of the contacts of the plurality of contacts are configured to be enabled or disabled to form different channels through the protocol-independent interface for each of the target protocols; and executing, by the controller, training instructions to train the controller to reformat data according to the selected first target protocol.

15. The method of claim 14, wherein the solid-state storage device further comprises a switch coupled to the protocol-independent interface and configured to enable selection of any of the target protocols for data transmission through the protocol-independent interface;
    wherein the switch is further configured to enable or disable each of the signal lines of the plurality of signal lines and each of the contacts of the plurality of contacts to form the different channels through the protocol-independent interface based on the selection of the switch.

16. The method of claim 15, wherein the first target protocol is selected with the switch for data transmission through the protocol-independent interface, and wherein the indication comprises the training instructions for training the controller to reformat data according to the selected first target protocol.

17. The method of claim 16, wherein the first target protocol is selected based on a first network adapter and a first communication port coupled to the protocol-independent interface, wherein each of the signal lines of the plurality of signal lines and each of the contacts of the plurality of contacts are further configured to be enabled or disabled to form a first channel through the protocol-independent interface based on the selected first target protocol, and wherein the method further comprises:
    receiving, by the controller, first data formatted according to the first protocol from the accessing device via the device interface;
    reformatting, by the controller, the first data according to the selected first target protocol; and
    transmitting, by the controller, the reformatted first data through the protocol-independent interface via the enabled signal lines of the plurality of signal lines and the enabled contacts of the plurality of contacts so that the reformatted data can be transmitted from the first network adapter and the first communication port.

18. The method of claim 15, wherein the first target protocol is selected with the switch for data transmission through the protocol-independent interface, wherein the indication comprises information identifying the selected first target protocol and is absent the training instructions for training the controller to reformat data according to the selected first target protocol, and wherein the method further comprises retrieving, by the controller, the training instructions from an on-controller memory or the non-volatile memory.

19. The method of claim 15, wherein the switch is further configured for manual selection of any of the target protocols during setup of the solid-state storage device with the any one of the network adapters and communication ports.

20. A non-transitory machine-readable storage medium storing machine-executable instructions that, when executed, cause a controller to perform a method for enabling a protocol-independent interface to support one of a plurality of target protocols, the method comprising:
    receiving, by the controller of a solid-state storage device, an indication of a first target protocol selected for data transmission through the protocol-independent interface, wherein the solid-state storage device comprises:
        the controller; and
        non-volatile memory coupled to the controller, wherein the controller is configured to perform read and write commands on the non-volatile memory;
    a device interface coupled to the controller, wherein the controller is further configured to receive data formatted according to a first protocol from an accessing device via the device interface;
    the protocol-independent interface coupled to the controller and configured to couple to any one of a plurality of network adapters and communication ports so as to enable the controller to transmit data from the any one of the plurality of network adapters and communication ports, wherein each of the plurality of network adapters and communication ports require a different target protocol for data transmission through the protocol-independent interface, and wherein each of the target protocols is also different from the first protocol;
    wherein the protocol-independent interface comprises a plurality of contacts, wherein the plurality of contacts are coupled to the controller by a plurality of signal lines that enable data transmission from the controller to the protocol-independent interface; and
    wherein each of the signal lines of the plurality of signal lines and each of the contacts of the plurality of contacts are configured to be enabled or disabled to form different channels through the protocol-independent interface for each of the target protocols; and
    executing, by the controller, training instructions to train the controller to reformat data according to the selected first target protocol.

* * * * *